United States Patent
Yasaki et al.

(10) Patent No.: US 7,768,877 B2
(45) Date of Patent: Aug. 3, 2010

(54) TRANSFER CONTROL DEVICE, TRANSFER CONTROL METHOD, TRANSFER UNIT AND DISC UNIT

(75) Inventors: Akira Yasaki, Kawagoe (JP); Shigeru Kojima, Kawagoe (JP); Norio Matsuda, Kawagoe (JP); Hideki Kinoshita, Kawagoe (JP); Hitoshi Yamazaki, Kawagoe (JP); Jun Togashi, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 1127 days.

(21) Appl. No.: 11/094,513

(22) Filed: Mar. 31, 2005

(65) Prior Publication Data

US 2006/0136937 A1    Jun. 22, 2006

(30) Foreign Application Priority Data

Mar. 31, 2004    (JP) .............................. 2004-105055

(51) Int. Cl.
*G11B 21/08*    (2006.01)
(52) U.S. Cl. ................................. 369/30.36
(58) Field of Classification Search ....................... None
See application file for complete search history.

(56) References Cited

U.S. PATENT DOCUMENTS 5,136,570 A * 8/1992 Takai et al. .................. 720/624
5,150,349 A * 9/1992 Takai et al. .................. 720/626
5,255,255 A * 10/1993 Kaneda et al. ............... 720/621

FOREIGN PATENT DOCUMENTS

| JP | 2000-348424 | 12/2000 |
|---|---|---|
| JP | 2001-56994 | 2/2001 |
| JP | 2003-208744 | 7/2003 |

OTHER PUBLICATIONS

Office Action corresponding to Japanese Patent Appln. No. 2004-105055 (Notification of Reason(s) for Refusal) dated Feb. 26, 2008.

* cited by examiner

*Primary Examiner*—Daniell L Negrón
*Assistant Examiner*—Henok G Heyi
(74) *Attorney, Agent, or Firm*—Kratz, Quintos & Hanson, LLP

(57) ABSTRACT

A disc transfer section for transferring an optical disc by guide members and a transfer roller is disposed adjacent to an opening of a casing 110. A detector 500 for detecting the optical disc is disposed adjacent to the opening. When unloading the optical disc, the peripheral edge of the optical disc contacts with slide members so that the slide members are slid, thereby sensor switches SW1 to SW4 are appropriately switched on and off. Based on a time difference between the timings of the on/off switchings, the relation between a movement trajectory of the center of the optical disc and an axis of symmetry that is a straight line indicating a transfer direction at the center of the opening is judged in order to control the drive of a transfer motor according to the movement trajectory. The amount of advancement when the unloading is completed is kept constant.

10 Claims, 14 Drawing Sheets

TRANSFER CONTROL DEVICE, TRANSFER CONTROL METHOD, TRANSFER UNIT AND DISC UNIT

BACKGROUND OF THE INVENTION

1. Field of the Invention

The present invention relates to a transfer control device, a transfer control method, a transfer unit and a disc unit for unloading a disc article to be transferred from a casing through an opening.

2. Description of Related Art

Heretofore, as a disc article to be transferred, a disc unit has been known that reads information recorded on a disc recording medium and records information on a disc recording medium. As such a disc unit, there is known a so-called slot-in type in which a transfer unit is provided for loading a disc recording medium into a casing and unloading the disc recording medium from the casing through a slit-shaped opening disposed at a front side. The slot-in type disc unit detects the disc recording medium by means of a switch or a sensor in order to control the drive of the transfer unit based on a detection status (see Patent Document 1: Japanese Patent Laid-Open publication No. 2001-56994 and Patent Document 2: Japanese Patent Laid-Open publication No. 2003-208744, for example).

A disc unit disclosed in the Patent Document 1 stops the drive of a roller for pulling and ejecting a disc when detecting that the large-diameter disc passes to be ejected by means of a disc passage detecting switch. When the disc passage detecting switch detects that a small-diameter disc passes to be ejected, the disc unit drives the roller for a predefined period of time to eject the disc for a distance A before stopping driving. Thus, the disc unit can stop the disc with different diameter (large or small) in a state that the disc center hole is ejected out of the disc unit body.

In a disc unit disclosed in the Patent Document 2, an optical detector is provided at a position where the detector does not face a small-diameter disc when a clamp mechanism for clamping discs clamps the small-diameter disc but faces a large-diameter disc when the clamp mechanism clamps the large-diameter disc, and the detector faces neither of the discs (small or large) when the discs are at each predefined ejection position, and the detector is near the position where the peripheries of the both discs intersect. When a disc is inserted, the detector detects the peripheral edge of the disc, thereby actuating a transfer roller to load the disc. When the disc is ejected, the transfer roller is arranged to be stopped if the detector cannot detect the disc.

In the above-described conventional arrangements disclosed in the Patent Documents 1 and 2, when unloading the disc recording medium by the transfer unit, the center of the disc recording medium may veer off the moving path of the disc recording medium passing through the center of the opening. In this case, the detection status of the disc recording medium by the switch or sensor changes as compared with the usual case where the center of the disc recording medium moves along the moving path. Accordingly, the disc recording medium may not be stopped at a normal predefined position, resulting in that, for instance, the disc recording medium may be overly unloaded to be dropped from the opening or that the disc recording medium may be stopped before the predefined position, so that the disc recording medium cannot be appropriately removed, which are disadvantageous.

SUMMARY OF THE INVENTION

In view of the current conditions stated above, it is an object of the present invention to provide a transfer control device, a transfer control method, a transfer unit, and a disc unit for appropriately unloading a disc article to be transferred.

The transfer control device of the present invention is a transfer control device for unloading the disc article to be transferred from a casing through an opening by the drive of an unloading unit along a direction of a diameter of the article that includes a detector for detecting a difference of a moving path of the center of the article to be unloaded relative to the transfer direction of the article substantially at the center of the opening and a driving controller for controlling the drive of the unloading unit according to a detection status of the article by the detector.

The transfer control method of the present invention is a transfer control method for unloading the disc article to be transferred along the direction of the diameter of the article from the casing through the opening by the drive of the unloading unit in which the detector for detecting the difference of the moving path of the center of the article to be unloaded relative to the transfer direction of the article substantially at the center of the opening is used in order to control the drive of the unloading unit according to the detection status of the article by the detector.

The transfer unit of the present invention includes the unloading unit for unloading the disc article to be transferred along the direction of the diameter of the article from the casing through the opening by the drive thereof and the transfer control device of the present invention for controlling the drive of the unloading unit.

The disc unit of the present invention includes the casing, an information processor disposed in the casing for performing at least either one of a read-out process for reading out the information recorded on the recording surface of the disc recording medium or a record process for recording the information on the recording surface and the above-described transfer unit of the present invention.

DETAILED DESCRIPTION OF PREFERRED EMBODIMENT(S)

An embodiment of the present invention will be described with reference to attached drawings.

In the present embodiment, a slot-in type disc unit that records information on and reads out information from an optical disc as a disc recording medium (a disc article to be transferred) is described as an example, however, any transfer unit for transferring the disc article may be used. The disc unit is not limited to the disc unit for processing information on an optical disc, but may be any kind of disc unit. The disc recording medium is not limited to the optical disc, but may be any kind of disc recording medium such as a magnetic disc and magnetooptical disc. Additionally, while the thin slot-in type disc unit that is provided to, for instance, an in-car navigation device is exemplified here, a stand-alone configuration is also available like a game console or reproducing device for recording and reproducing video data that are installed in an electric equipment such as a portable personal computer. The configuration is not even limited to be thin.

[Arrangement of Disc Unit]

Figure 1:
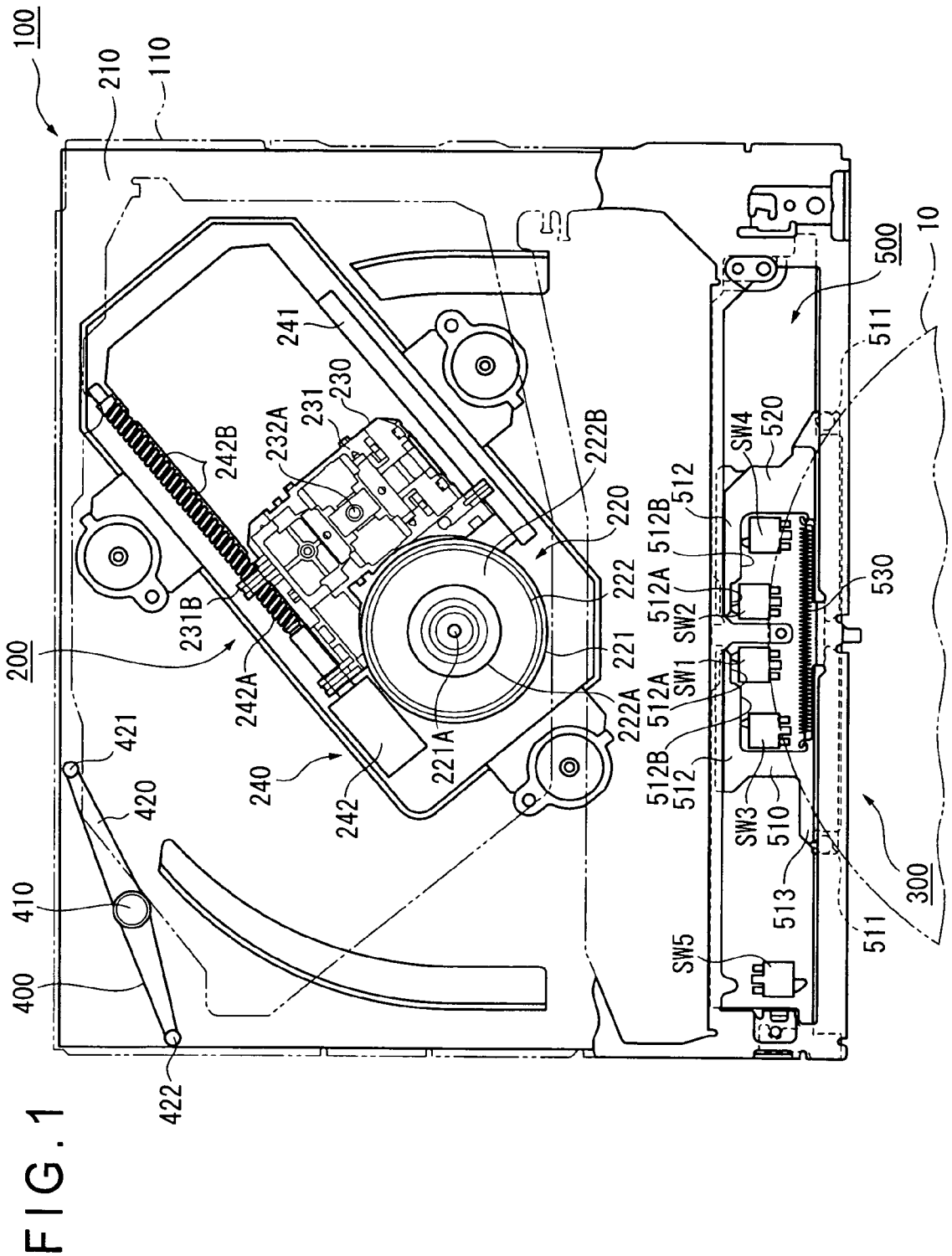
FIG. 1 is a plan view schematically showing an arrangement of a disc unit according to an embodiment of the present invention with a part thereof being cut.
Figure 2:
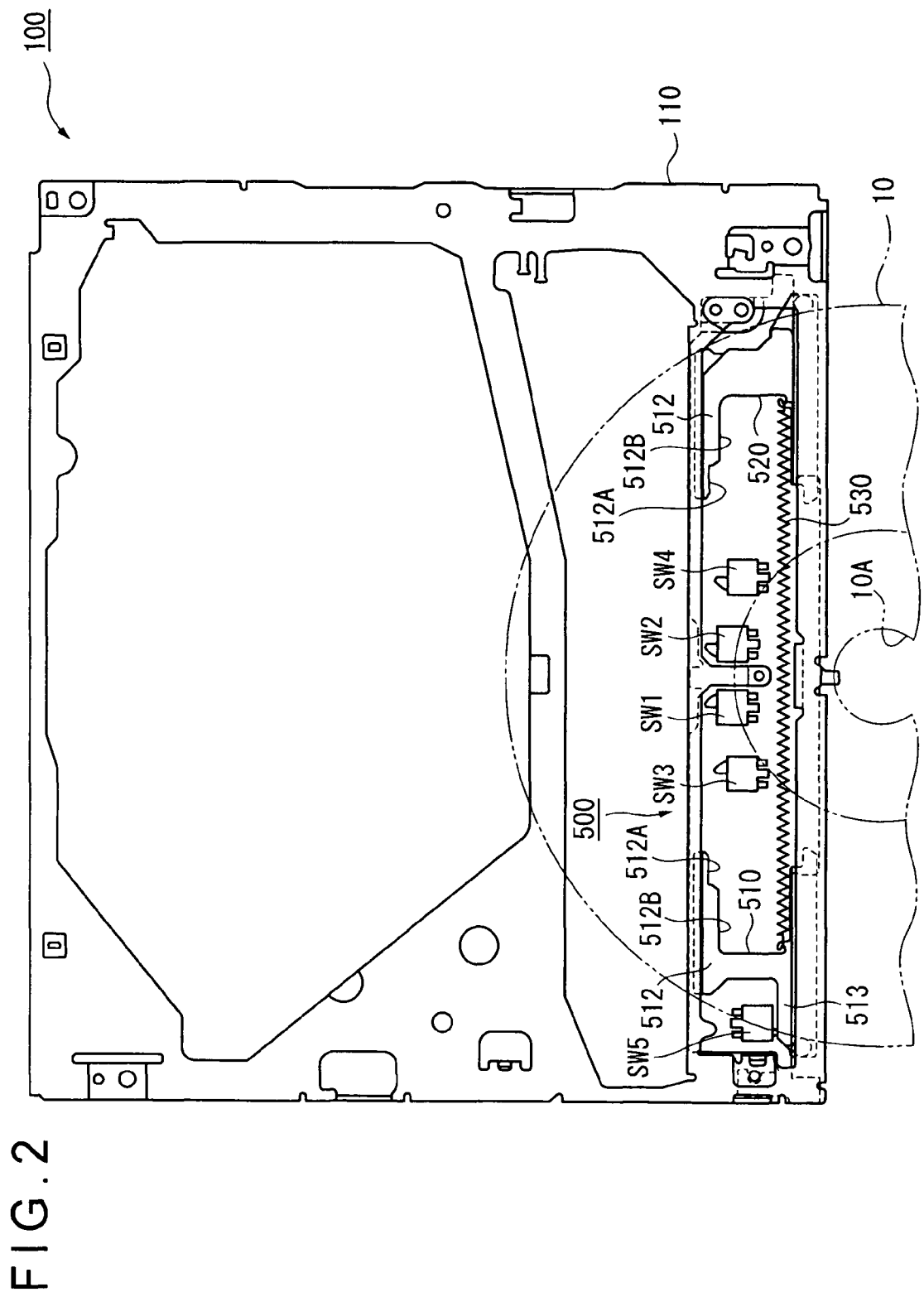
FIG. 2 is a plan view schematically showing an arrangement of the disc unit according to the embodiment with a part thereof being cut.

In FIGS. 1 and 2, a disc unit 100 is a so-called thin slot-in type installed in, for example, an in-car navigation device. The disc unit 100 performs information processing for reading out information recorded on a recording surface (not shown) provided on at least one side of a plate-shaped optical disc 10 as a disc recording medium detachably attached and for recording various pieces of information on the recording surface. The disc unit 100 has a box-like casing 110, which is for instance made of metal and has a space inside. A decorative plate is provided on a lateral surface of the casing 110, the decorative plate being made of, for instance, synthetic resin formed in an elongated plate. An thin slit-like opening (not shown) is provided in the decorative plate in a longitudinal direction. There disposed in the casing 110 are a disc processing section 200 for performing the information processing, a disc transfer section 300 as an unloading unit, an loading sensor 400 as a housing detector, a detector 500, and a system controller (not shown) functioning as a driving controller for controlling the operation of the entire disc unit 100.

The disc processing section 200 has a pair of opposing mounts 210. These mounts 210 are disposed in the casing 110 rotatably and opposingly to each other. One of the mounts 210 has a disc rotation driver 220 constituting a driver (not shown) and a rotor (not shown) rotatably supported by the other mount (not shown). The disc rotation driver 220 has a spindle motor 221 provided on one of the mounts 210, and a turn table 222 integrally formed with an output shaft 221A of the spindle motor 221. The spindle motor 221 is controllably connected to the system controller and driven by electric power supplied from the system controller. The turn table 222 has a substantially cylindrical rotating shaft 222A, which is a supporting portion inserted and fit to an axial hole 10A formed at the center of the optical disc 10, and a collar 222B projecting in flange shape on the outer circumferential surface of the rotating shaft 222A so that the peripheral edge of the axial hole 10A of the optical disc 10 is put thereon to be held thereby. By the rotation of the mounts 210 in directions opposing to each other, the turn table 222 sandwiches the optical disc 10 together with the rotor (not shown) supported by the other mount. The sandwiched optical disc 10 is rotated together with the turn table 222 rotated by the drive of the spindle motor 221 and the sandwiching rotor. The pair of mounts 210 are rotated by the drive of the transfer motor (not shown) of the disc transfer section 300 which is transmitted via a transmission unit (not shown).

In addition, the one of the mounts 210 is provided with a moving unit 240 for moving an optical pickup 230 as an information processor. The moving unit 240 has a pair of guide shafts 241 and a moving motor 242 such as a stepping motor or a direct current motor. The pair of guide shafts 241 are, for instance, made of metal, formed in elongated rods, and disposed in substantially parallel to the mounts 210. Further, the moving motor 242 is controllably connected to the system controller and is driven by electric power supplied from the system controller. A lead screw 242A made of, for instance, metal and formed in an elongated rod is integrally and coaxially coupled to the output shaft (not shown) of the moving motor 242. On the outer circumferential surface of the lead screw 242A, an engaging groove 242B is spirally provided.

The optical pickup 230 is movably supported by the pair of guide shafts 241. The optical pickup 230 has a holder 231 that is supported in a bridge state between the pair of guide shafts 241. A movement restricting claw 231B engaging with the engaging groove 242B of the lead screw 242A of the moving unit 240 is provided on the holder 231. The optical pickup 230 has a light source (not shown) disposed on the holder 231, a plurality of optical elements (not shown) having an objective lens 232A for irradiating the light from the light source onto the optical disc 10, and an optical sensor (not shown) for detecting the light reflected from the optical disc 10. The optical pickup 230 which is connected to the system controller so that signals can be sent and received performs, under control of the system controller, the read out process for reading out various pieces of information recorded on the recording surface of the optical disc 10 to output to the system controller and the recording process for recording the various pieces of information from the system controller onto the recording surface.

Figure 3:
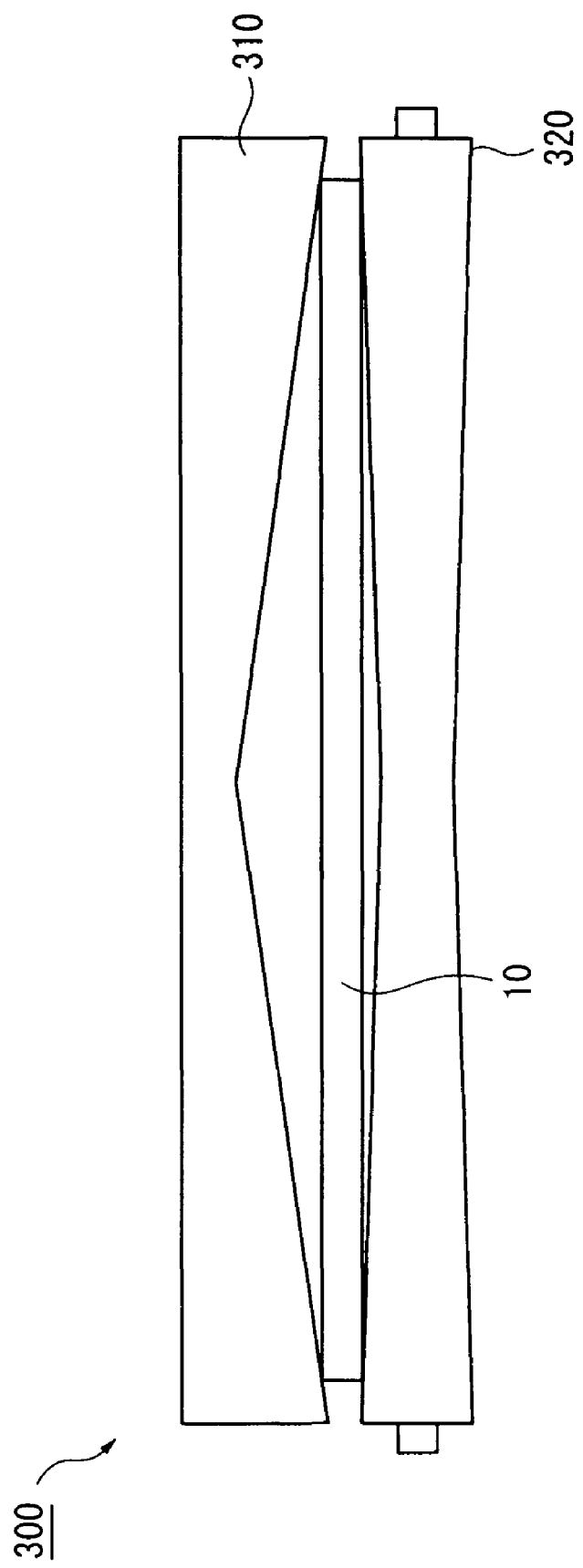
FIG. 3 is a diagram schematically showing an arrangement of a disc transfer section according to the embodiment.

As shown in FIG. 3, the disc transfer section 300 has a guide member 310 disposed in the casing 110, a transfer roller 320 as a rotation member that is rotatably disposed in the casing 110, and a driver (not shown) for rotating the transfer roller 320. The transfer roller 320 is provided so as to be disposed at the side of the recording surface (one side of the optical disc 10), and the guide member 310 is provided so as to be disposed at the label side (the other side of the optical disc 10). In other words, the disc transfer section 300 has a moving path for the optical disc 10 which is provided between the transfer roller 320 and the guide member 310, and along this moving path, the optical disc 10 is loaded in and unloaded from the casing 110 in the transfer direction perpendicular to the open face of the opening of the decorative plate.

The guide member 310 is made of, for example, resin and is formed longitudinal in a direction substantially perpendicular to the transfer direction of the moving path and in a wall-like and reversed V-shape viewed from the front so that the height thereof projecting toward the moving path is gradually increased to the maximum at the both ends of the longitudinal direction. The guide member 310 is disposed substantially parallel to the transfer direction.

The transfer roller 320 is formed in an elongated, substantially-concave drum shape and is disposed between the pair of guide members 310 rotatably around a rotating shaft in a direction that intersects with the transfer direction. The transfer roller 320 has the peripheral surface covered with soft material such as rubber and is formed in the elongated, substantially-concave drum shape in which the diameter thereof gradually gets bigger as coming to the both ends of the axial direction. The transfer roller 320 is coupled at one end thereof in the axial direction with a transmission unit having various gears for transmitting the drive by the electric motor (not shown) of the driver so as to be rotated by the drive of the electric motor.

When the optical disc 10 is sandwiched by the turn table 222 and the rotor and transferred to its predefined position, that is, to the position where the information processing is performed, the disc transfer section 300 operates so that the guide member 310 and the transfer roller 320 move apart. Namely, the pair of mounts 210 are rotated in opposing directions by the drive of the transfer motor, and the transfer roller 320 is moved so as to be apart from the guide member 310 via the power transmission member such as a cam. Thus, the rotation of the mounts 210 allows a state that neither of the guide member 310 nor the transfer roller 320 contacts the optical disc 10 rotatably supported.

As shown in FIG. 1, the loading sensor 400 is disposed on the one of the mounts 210 and detects that the optical disc 10 is substantially loaded into a position where the optical disc 10 is sandwiched by the turn table 222 and the rotor of the other mount. The loading sensor 400 has a shaft 410 pivotally supported by the mounts 210 and an arm 420 fixed to the shaft 410. On one end of the arm 420, one abutment 421 that contacts with the optical disc 10 loaded by the disc transfer section 300 is disposed, while on the other end of the arm 420, the other abutment 422 that contacts with the loading sensor switch (not shown) is disposed. In addition, a torsion coil spring (not shown) is provided on the shaft 410, and by the biasing force of the torsion coil spring, the one abutment 421 is projecting into the moving path of the optical disc 10. Since the loaded optical disc 10 contacts with the one abutment 421, the arm 420 is rotated around the shaft 410, and the other abutment 422 contacts with the loading sensor switch, thereby the loading sensor switch is turned on. An on signal of the loading sensor switch is output to the system controller, so that, based on the on signal, the system controller recognizes that the optical disc 10 is located at the predefined position, i.e. at the processing position where the optical disc 10 is sandwiched by the turn table 222 and the rotor for information processing. The loading sensor switch may employ any arrangement in which different signals can be output for the optical disc 10 depending on the diameters (e.g. 8 cm and 12 cm) or in which a plurality of switches having different on-off timings based on the rotation status of the arm 420 in rotation are provided so that the optical disc 10 can be detected even if the optical discs 10 varies in diameter, for instance.

As shown in FIGS. 1, 2, 4 and 5, the detector 500 detects the optical disc 10 inserted through the opening as well as the transfer status of the optical disc 10 transferred by the transfer roller 320. The detector 500 has a pair of slide members 510 and 520, a coil spring 530, a plurality of, for example, two pairs of sensor switches (four sensor switches) SW1, SW2, SW3 and SW4 as a detecting section and a type sensor switch SW5 for sensing the type of the optical disc 10.

Figure 5:
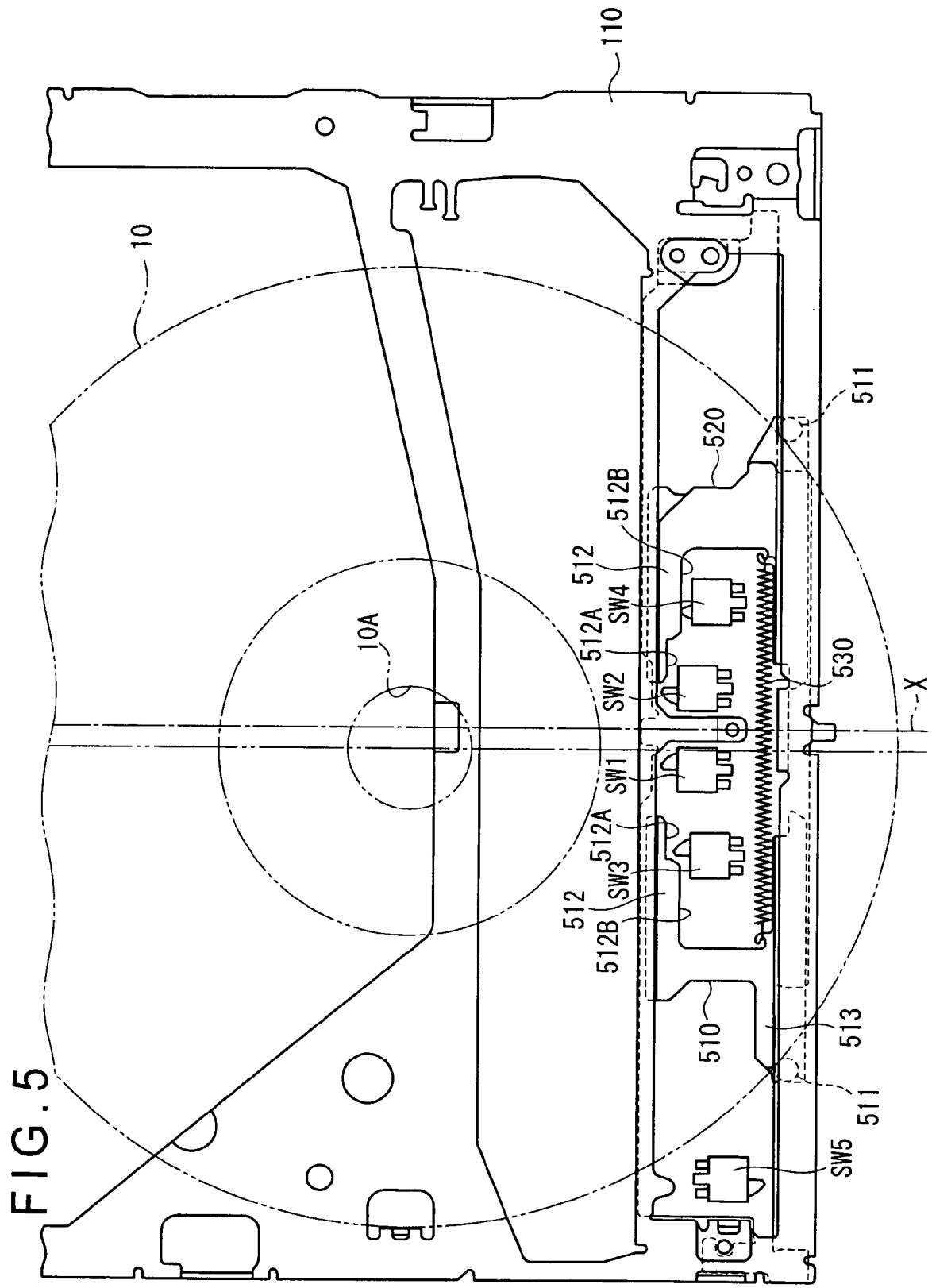
FIG. 5 is a plan view showing a portion adjacent to the detector of the disc unit according to the embodiment with a part thereof being cut.

The pair of slide members 510 and 520 are made of, for example, resin such as Acrylonitrile-butadiene-styrene (ABS) having good sliding characteristics, are located in proximity to the opening of the casing 110, and disposed in pairs slidably along the width direction of the casing 110 which is the longitudinal direction of the opening. As shown in FIG. 5, the slide members 510 and 520 are disposed symmetrically having an axis along the transfer direction passing substantially the center of the opening (i.e. a line passing the center of the opening and the central axis of the turn table 222) as the axis of symmetry X and each member is movably disposed at each side of the axis of symmetry X.

Each of the slide members 510 and 520 has a sensor projecting from each side, respectively. The sensor having a rotating shaft (not shown) disposed in an axial direction along the width direction of the opening and a cylindrical sensor roller 511 rotatably pivotally supported by the rotating shaft is disposed so that the sensor can contact with the peripheral surface of the optical disc 10 transferred through the opening and projects on the moving path near the opening. The sensors are disposed in a position where the optical disc 10 will not be inserted to between the sensor roller 511 and the side of the casing in its width direction even if the center of the optical disc 10 is inserted in a state that the optical disc 10 is maximally displaced from the axis of symmetry X (i.e. the peripheral edge of the optical disc 10 contacts with the opening edge of the opening), but the optical disc 10 is guided between the sensor rollers 511 for insertion.

In addition, the slide members 510 and 520 have a sensor arm 512 that is longitudinal in the movement direction. The tip of the sensor arm 512 is tapered, so that the sensor arm 512 has a first step 512A and a second step 512B disposed stepwise in the transfer direction substantially perpendicular to the slide direction. The pair of slide members 510 and 520 are coupled with each end of the coil spring 530 and a bias force, i.e. tension, is applied toward the substantially center of the casing 110 in the width direction. In addition, the slide member 510 has a type sensor arm 513 that is longitudinal in the movement direction.

The sensor switches SW1 to SW4 are arranged such that the sensor switches are switched on or off by the sensor arm 512 in accordance with the movement of the slide members 510 and 520, and electric signals generated by the on and off operations are output to the system controller. The sensor switches SW1 to SW4 are disposed in two pairs, each pairs being at positions with different distances from the above-mentioned axis of symmetry X. That is, the sensor switches SW1 and SW2 are disposed at relatively near positions to the axis with the same distance from the axis of symmetry X, while the sensor switches SW3 and SW4 are disposed at relatively far positions with the same distance from the axis of symmetry X. Furthermore, the positions of each pairs of the sensor switches SW1 and SW2 and the sensor switches SW3 and SW4 are displaced from each other in the transfer direction, i.e. are disposed in correspondence with the positions of the first step 512A and the second step 512B of the slide members 510 and 520, respectively.

Specifically, the sensor switches SW1 and SW2 and the sensor switches SW3 and SW4 are located to be switched on by the first step 512A and the second step 512B respectively when the slide members 510 and 520 approach closest to the axis of symmetry X in the normal state. The sensor switches SW1 and SW2 are switched off when the peripheral edge of the optical disc 10 contacts with the sensor roller 511 to slightly move the slide members 510 and 520, thereby the sensor switches SW1 and SW2 are moved off the first step 512A. In other words, the sensor switches SW1 and SW2 are located such that, when the optical disc 10 having a diameter of approximately 12 cm is inserted in a condition where the center of the optical disc 10 is maximally displaced to one side relative to the axis of symmetry X, so that the peripheral edge of the optical disc 10 contacts with the opening edge of the opening, the peripheral edge of the optical disc 10 contacts with the sensor rollers 511 of both slide members 510 and 520 just before contacting with the peripheral surface of the transfer roller 320, thereby both of the sensor switches SW1 and SW2 are switched off. The sensor switches SW1 and SW2 are also arranged such that, when the optical disc 10 having a diameter of approximately 8 cm is inserted through the opening, so that the peripheral edge of the optical disc 10 contacts with the sensor roller 511 just before contacting with the peripheral surface of the transfer roller 320, at least one of the sensor switches SW1 and SW2 is switched off. Furthermore, the sensor switches SW1 and SW2 are disposed at positions such that the sensor switches SW1 and SW2 are switched on when the optical disc 10 is located substantially at the processing position and the loading sensor 400 detects the optical disc 10 is located substantially at the processing position.

In addition, when the slide members 510 and 520 are moved due to the insertion or transfer of the optical disc 10, the sensor switches SW3 and SW4 are moved off the second step 512B, thereby being switched off. Subsequently, the sensor switches SW3 and SW4 are disposed at positions such that both switches are approximately simultaneously switched from on to off in a state that, when the optical disc 10 having a diameter of approximately 8 cm is unloaded from the casing 110 with the center of the optical disc 10 kept in alignment with the axis of symmetry X, a portion of the peripheral edge is sandwiched by the guide member 310 and the transfer roller 320 and the axial hole 10A provided substantially in the center of the optical disc 10 is located outside the casing 110 from the opening. Furthermore, when the sensor switches SW1, SW3 (SW2, SW4) are switched off, the sensor switches SW1, SW3 (SW2, SW4) are disposed in a positional relation where the sensor switch SW4 (SW3) is switched on before the sandwiching by the transfer roller 320 and the guide member 310 of the peripheral surface of the approximately 8 cm optical disc 10 to be unloaded is released.

A type sensor switch SW5 is arranged to be switched on/off by the type sensor arm 513 in accordance with the movement of the slide member 510 and the electric signals generated by switching on/off are output to the system controller. The type sensor switch SW5 is disposed at a position on one side in the longitudinal direction of the opening. Specifically, when the optical disc 10 having a diameter of approximately 12 cm is inserted, at least the sensor switch SW4 and the type sensor switch SW5 are both switched over. Furthermore, the sensor switch SW4 and the type sensor switch SW5 are located so that the type sensor switch 5 will be switched over but the sensor switch SW4 will not be switched over when the optical disc 10 having a diameter of approximately 8 cm is inserted with a maximum displacement toward the left side of FIG. 2. Accordingly, whether the size of the inserted optical disc 10 is 12 cm or 8 cm can be identified. In addition, the sensor switch SW5 is disposed in a positional relation where the sensor switch SW5 is switched on before the sandwiching by the transfer roller 320 and the guide member 310 of the peripheral surface of the approximately 12 cm optical disc 10 to be unloaded is released.

The system controller constitutes, for instance, a circuit board having various electric parts installed thereon as a circuit structure and controls the operation of the entire disc unit 100. The system controller, when recognizing that at least one of the sensor switches SW1 and SW2 is switched off, determines that the optical disc 10 is inserted and performs the operation of driving the transfer motor of the disc transfer section 300 to rotate the transfer roller 320, thereby transferring the optical disc 10 into the casing 110 through the opening. When recognizing that the loading sensor switch of the loading sensor 400 is switched on, the system controller determines that the optical disc 10 is inserted and performs the operation of rotating the pair of mounts 210 in opposing directions to each other, thereby sandwiching the optical disc 10 by the turn table 222 and the rotor.

When recognizing the unload request of the optical disc 10, the system controller rotates the pair of mounts 210 in a reverse direction of the direction opposing each other to release the sandwiching of the optical disc 10 by the turn table 222 and the rotor. Further, the system controller performs the operation of driving the transfer motor of the disc transfer section 300 to rotate the transfer roller 320, thereby unloading the optical disc 10 from the opening. As the unload request, recognition of an operation on an eject button, or recognition of instruction signals from electrical devices for unloading the optical disc 10 may be exemplified.

When unloading the optical disc 10, the system controller recognizes the transfer condition of the optical disc 10 to be loaded based on the on/off status of the sensor switches SW1 to SW4 and the type sensor switch SW5 in order to appropriately control the drive of the transfer motor of the disc transfer section 300 so that the unloading of the optical disc 10 can be completed at the predefined position. Specifically, the drive of the transfer motor is controlled so that, even if the optical disc 10 is unloaded with the center of the optical disc 10 displaced from the axis of symmetry X, the amount of advancement from the opening is substantially equal to the case when the optical disc 10 is unloaded with the center of the optical disc 10 moving on the axis of symmetry X.

[Operation of Disc Unit]

The operation of the disc unit 100 according to the above-mentioned embodiment will be described with reference to FIGS. 6 to 12.

Figure 7:
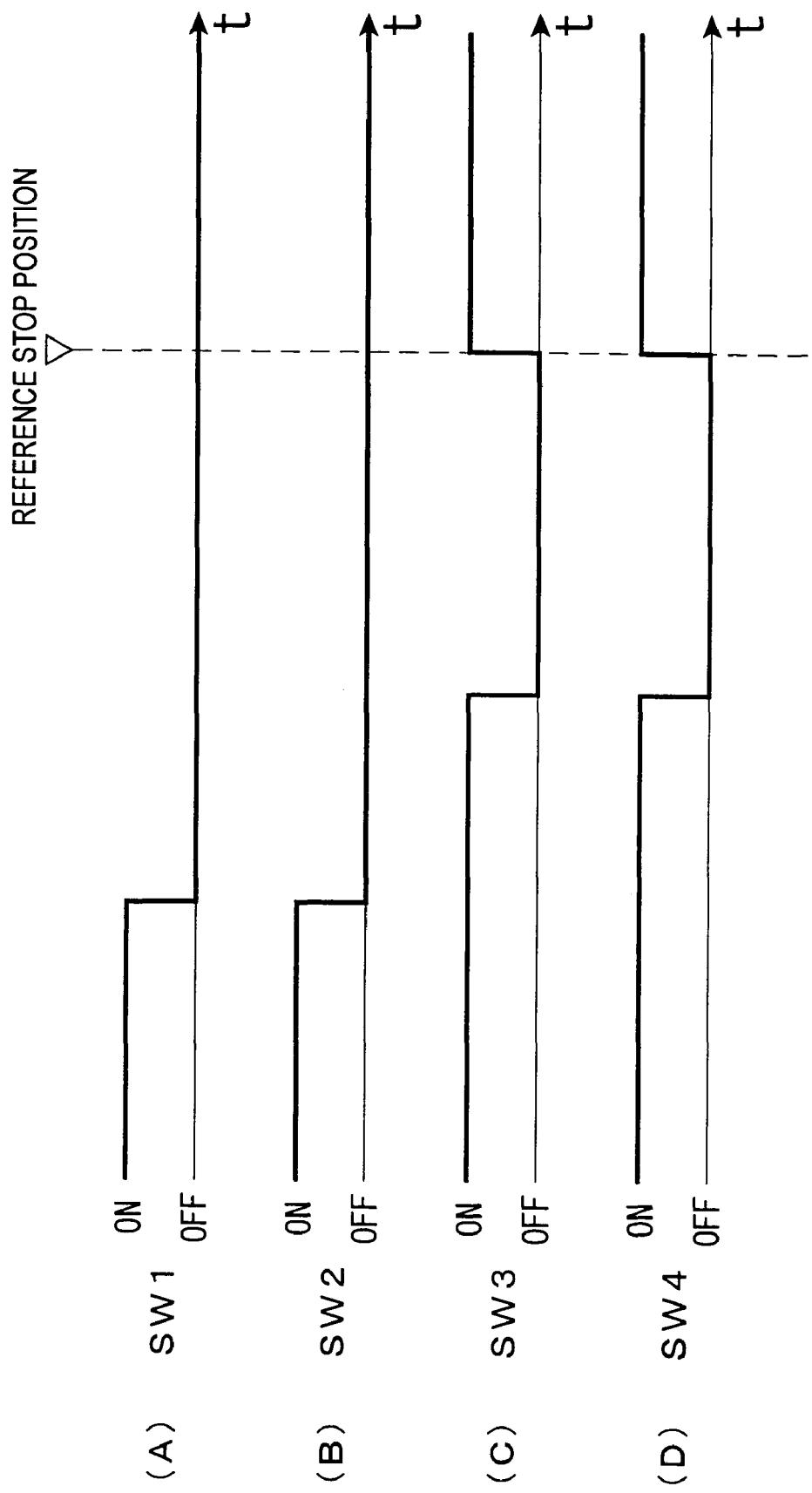
FIG. 7 is a waveform illustration of a sensor switch for a movement trajectory A according to the embodiment, in which (A) is a waveform illustration of a sensor switch SW1, (B) is a waveform illustration of a sensor switch SW2, (C) is a waveform illustration of a sensor switch SW3, and (D) is a waveform illustration of a sensor switch SW4.
Figure 8:
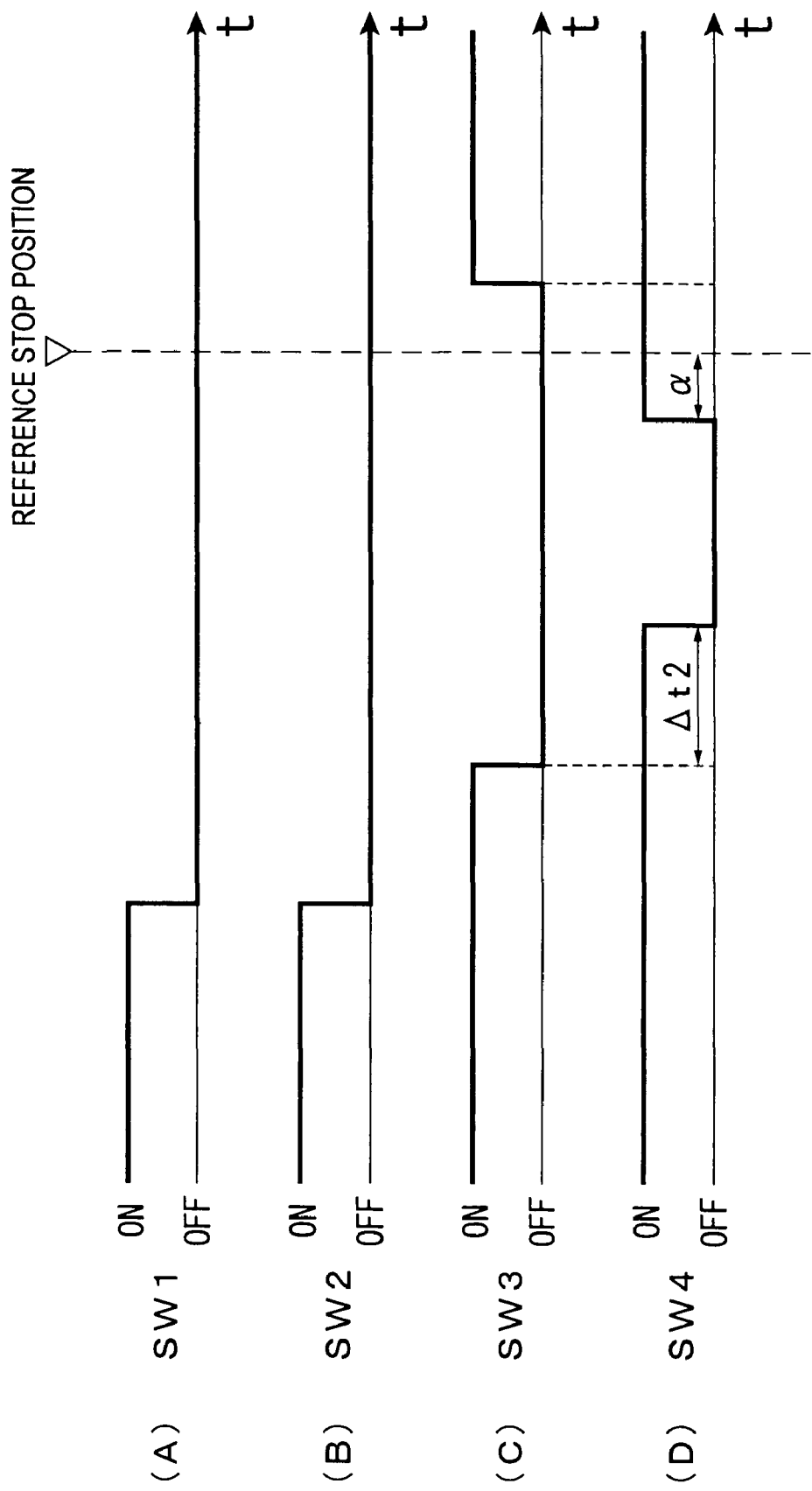
FIG. 8 is a waveform illustration of a sensor switch for a movement trajectory B according to the embodiment, in which (A) is a waveform illustration of the sensor switch SW1, (B) is a waveform illustration of the sensor switch SW2, (C) is a waveform illustration of the sensor switch SW3, and (D) is a waveform illustration of the sensor switch SW4.
Figure 9:
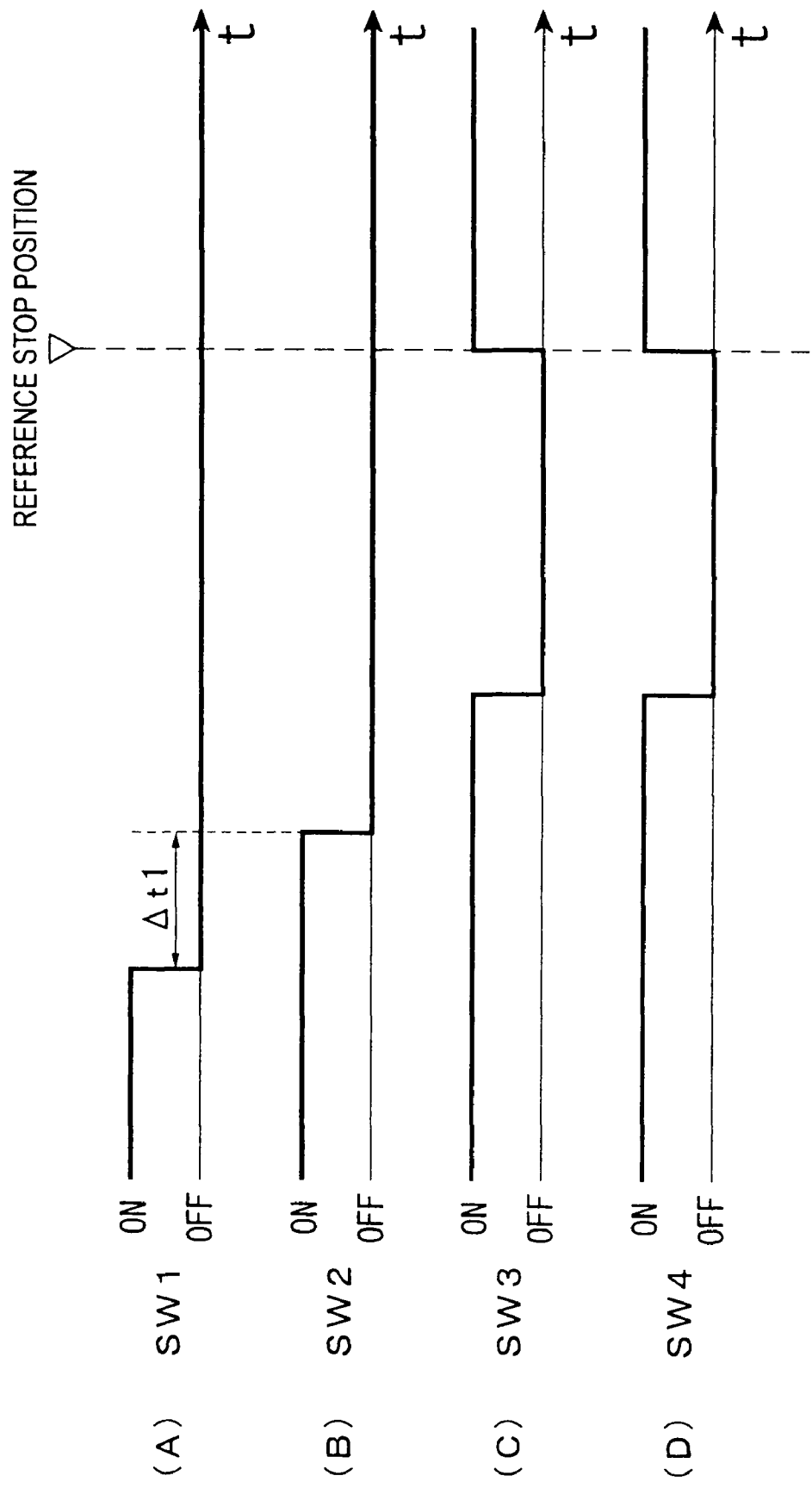
FIG. 9 is a waveform illustration of a sensor switch for a movement trajectory C according to the embodiment, in which (A) is a waveform illustration of the sensor switch SW1, (B) is a waveform illustration of the sensor switch SW2, (C) is a waveform illustration of the sensor switch SW3, and (D) is a waveform illustration of the sensor switch SW4.
Figure 10:
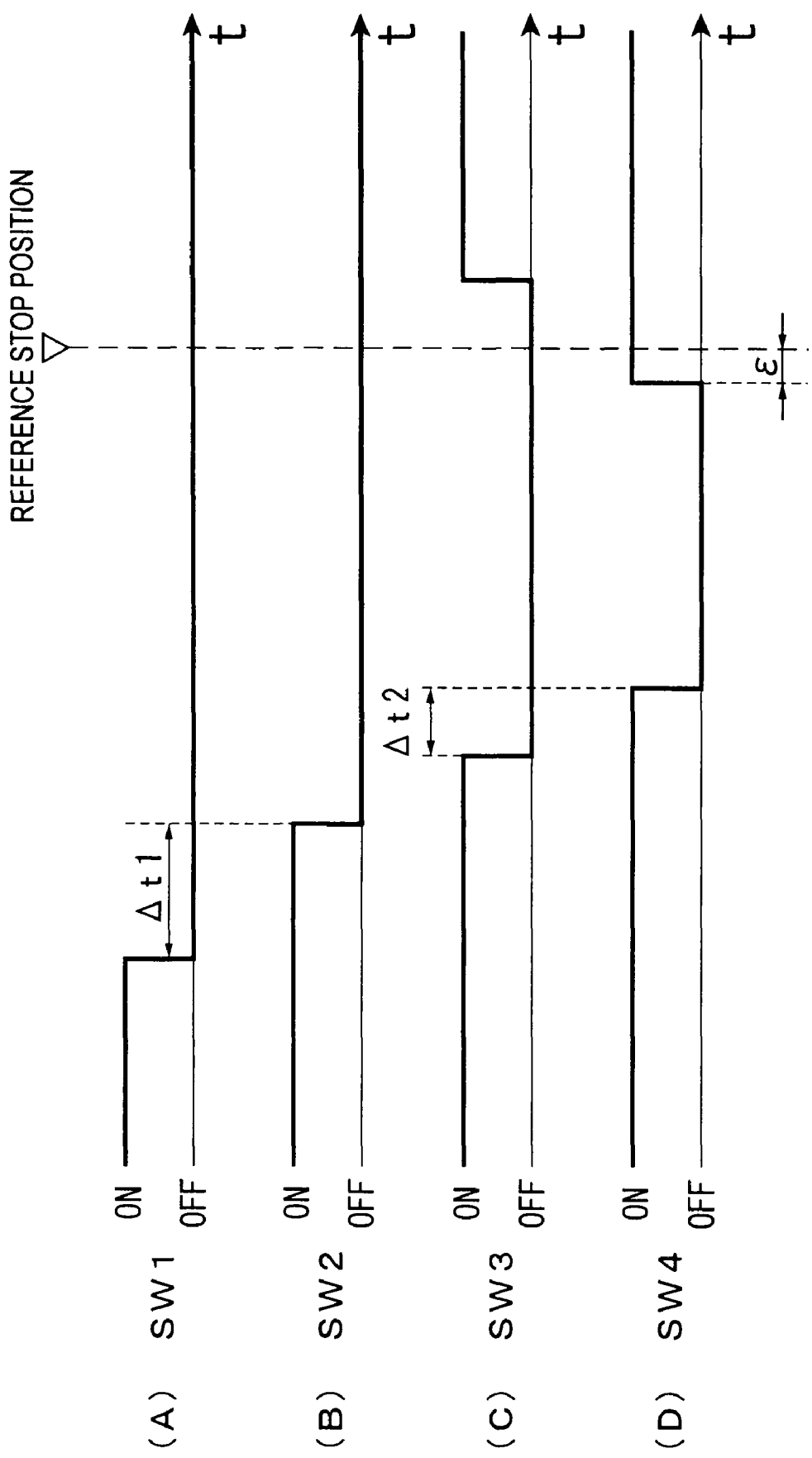
FIG. 10 is a waveform illustration of the sensor switch for the movement trajectory C with the center of the optical disc not located on the axis of symmetry according to the embodiment, in which (A) is a waveform illustration of the sensor switch SW1, (B) is a waveform illustration of the sensor switch SW2, (C) is a waveform illustration of the sensor switch SW3, and (D) is a waveform illustration of the sensor switch SW4.
Figure 11:
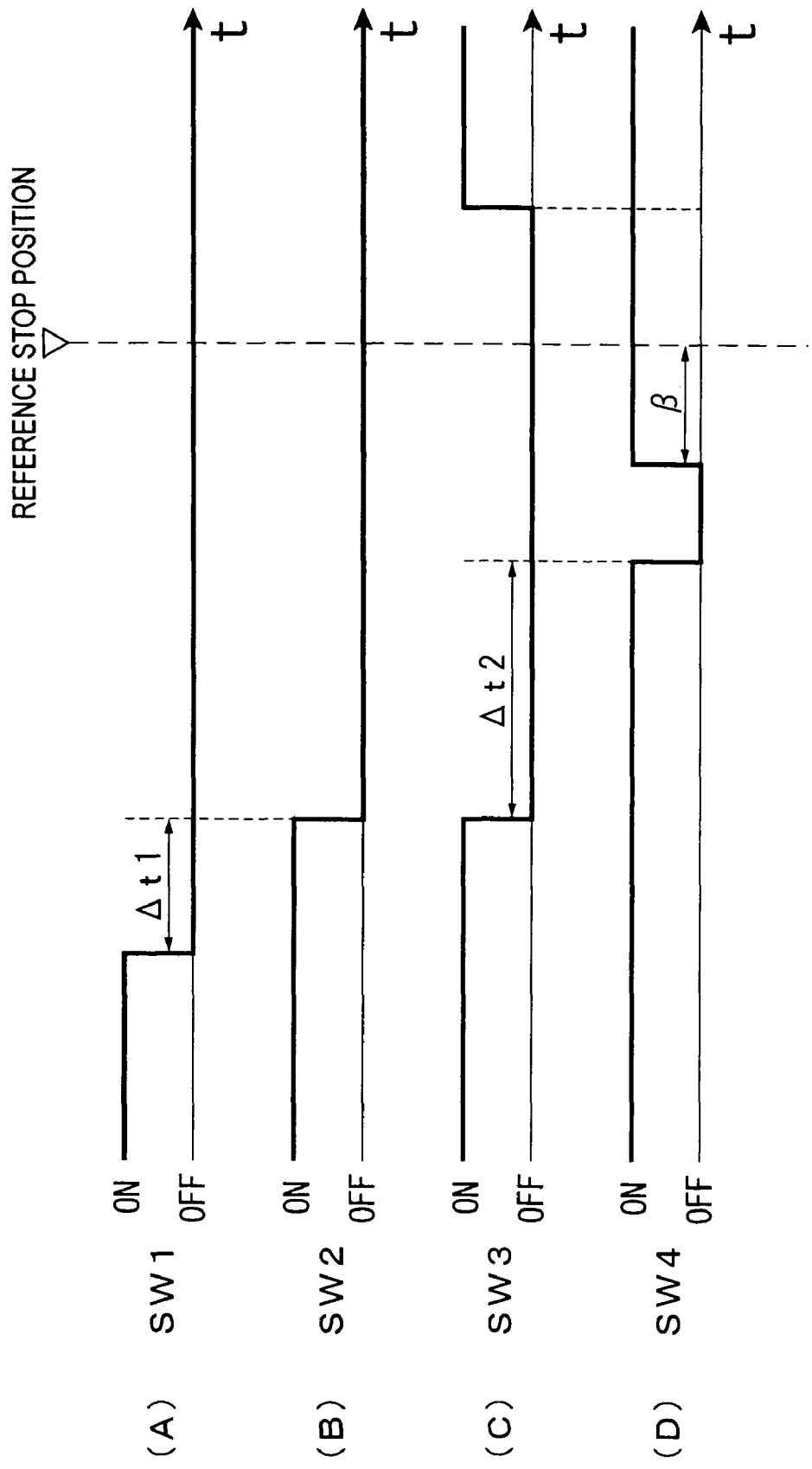
FIG. 11 is a waveform illustration of a sensor switch for a movement trajectory D according to the embodiment, in which (A) is a waveform illustration of the sensor switch SW1, (B) is a waveform illustration of the sensor switch SW2, (C) is a waveform illustration of the sensor switch SW3, and (D) is a waveform illustration of the sensor switch SW4.
Figure 12:
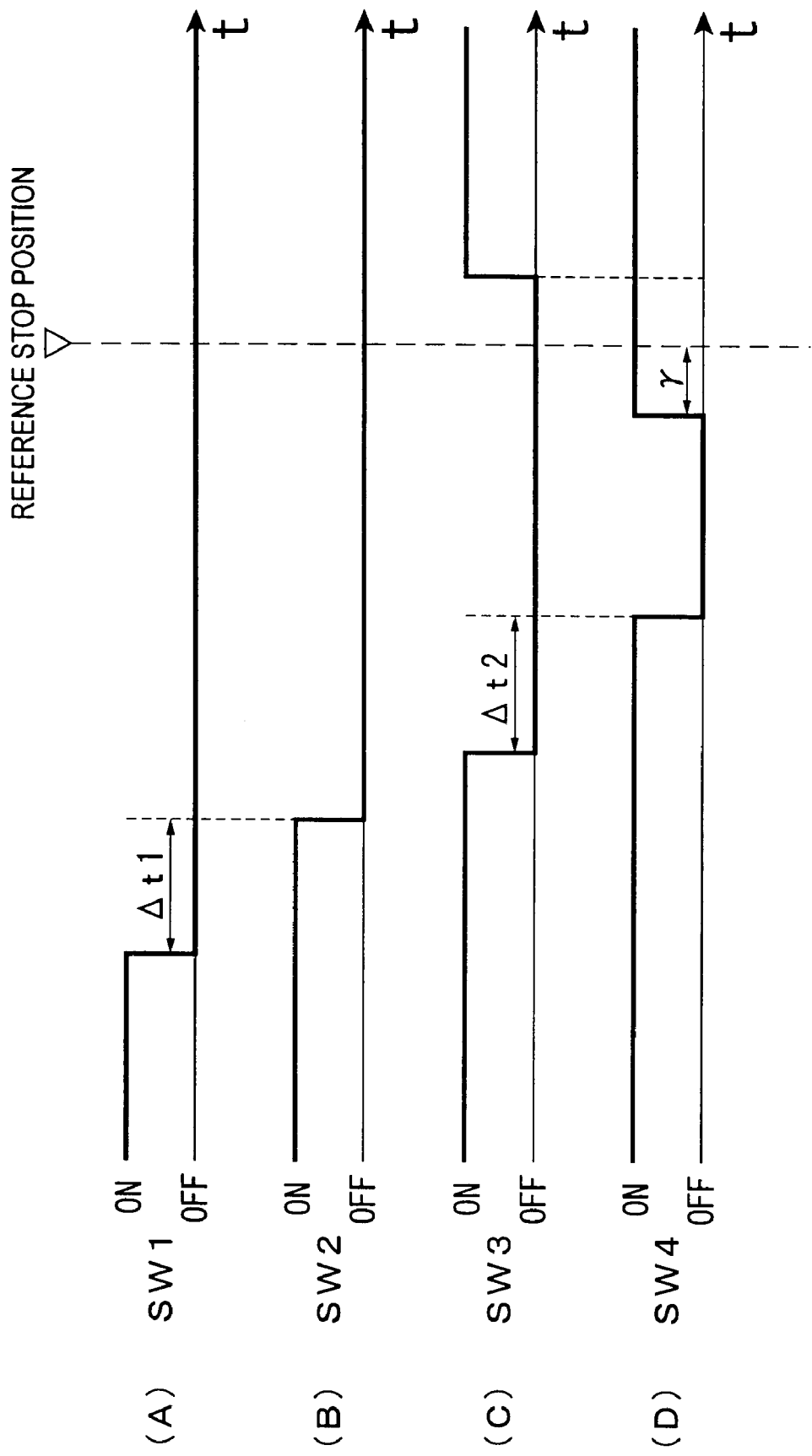
FIG. 12 is a waveform illustration of a sensor switch for a movement trajectory E according to the embodiment, in which (A) is a waveform illustration of the sensor switch SW1, (B) is a waveform illustration of the sensor switch SW2, (C) is a waveform illustration of the sensor switch SW3, and (D) is a waveform illustration of the sensor switch SW4.

FIGS. 7 to 11 are waveform illustrations of the sensor switches for each movement trajectory, in which (A) is a waveform illustration of the sensor switch SW1, (B) is a waveform illustration of the sensor switch SW2, (C) is a waveform illustration of the sensor switch SW3, and (D) is a waveform illustration of the sensor switch SW4. FIGS. 7, 8 and 9 show the cases of movement trajectories A, B and C, respectively, when the center of the optical disc 10 returns onto the axis of symmetry X, FIG. 10 shows the case of movement trajectory C when the center of the optical disc does not return onto the axis of symmetry X, FIG. 11 shows the case of movement trajectory D, and FIG. 12 shows the case of movement trajectory E.

When the electrical device is turned on, electric power is supplied to the disc unit 100. Owing to the electric power supply, the system controller can recognize, based on the on/off status of the loading sensor switch of the loading sensor 400, whether or not the optical disc 10 is loaded. Specifically, the system controller determines that the optical disc 10 is been loaded and located at the load completion position, if the loading sensor switch of the loading sensor 400 is on. On the other hand, if the loading sensor switch of the loading sensor 400 is off, the system controller determines that the optical disc 10 is not loaded. The system controller then outputs a signal with regard to whether or not the optical disc 10 is loaded to, for example, a circuit controlling the operation of the electrical device in order to display the loading condition of the optical disc 10 on a display or the like.

Figure 4:
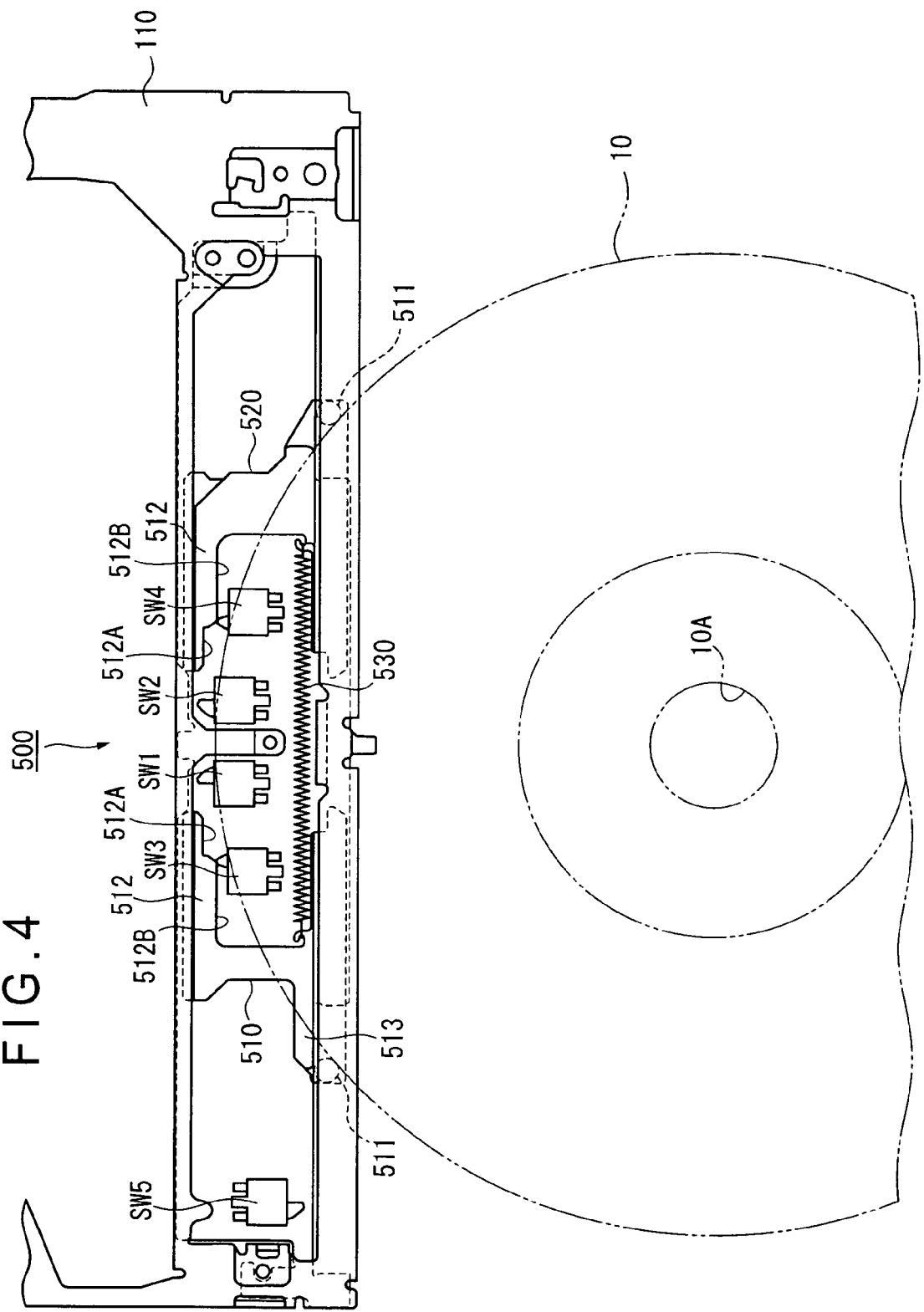
FIG. 4 is a plan view showing a portion adjacent to a detector of the disc unit according to the embodiment with a part thereof being cut.

If the optical disc 10 is not loaded, when the optical disc 10 is inserted through the opening, the peripheral edge of the optical disc 10 contacts with the sensor roller 511 of either one of the slide members 510 and 520 of the detector 500. If the optical disc 10 is further pushed inward in this condition, the slide member 510 (520) moves, so that the sensor is pushed outward resisting against the biasing force of the coil spring 530 as shown in FIG. 4, for example. At the beginning of the movement, the first step 512A of the slide member 510 (520) moves off the sensor switch SW1 (SW2), thereby switching the sensor switch SW1 (SW2) off. When the system controller receives an electric signal in accordance with this switching-off, the system controller determines that the optical disc 10 is inserted to drive the transfer motor of the disc transfer section 300, thereby rotating the transfer roller 320.

When the optical disc 10 to be inserted is inserted between the guide member 310 and the transfer roller 320, the optical disc 10 is transferred into the casing 110 by the rotating transfer roller 320 while being sandwiched by the guide member 310 and the transfer roller 320. When the optical disc 10 is transferred just before the predefined processing position, the peripheral edge of the optical disc 10 being transferred contacts with the abutment 421 of the loading sensor 400 to rotate the arm 420, so that the abutment 422 contacts with the loading sensor switch, thereby the loading sensor switch being switched on. Owing to that the loading sensor switch is switched on, the system controller rotates the pair of mounts 210 in directions opposing to each other to perform the operation of sandwiching the optical disc 10 by the turn table 222 and the rotor as well the operation of stopping the drive of the transfer motor. Thus, the optical disc 10 is sandwiched by the turn table 222 and the rotor, and a focus search or tracking search is performed under the control of the system controller to perform the operation of recognizing the type of the optical disc 10 such as a CD (Compact Disc), DVD (Digital Versatile Disc) or the like and to perform the information processing such as reading-out the information recorded in the read-in area. Additionally, if the system controller recognizes the effect of requesting further information processing, the system controller suitably controls the operation of the disc processing section 200 to perform information processing such as reading-out or recording of the information.

When the optical disc 10 is loaded, if the diameter of the optical disc 10 is 12 cm, the type sensor switch SW5 is switched on by the type sensor arm 513 of the slide member 510, while if the diameter of the optical disc 10 is 8 cm, the type sensor switch SW5 is not switched on. Thus, the system controller can recognize the type of optical discs 10 having different diameters. Subsequently, when the optical disc 10 is loaded into the casing 110, sandwiched by the turn table 222 and the rotor, and further loaded to the load completion position for the information processing, the sensor switches SW1 to SW4 are switched on again while the type sensor switch SW5 is switched off again.

If the system controller recognizes the unload requests of the optical disc 10 such as the operation on the eject button for requiring ejection of the optical disc 10 and the reception of a request signal requiring the ejection from the electrical device, the system controller suitably drives the transfer motor to rotate the pair of mounts 210 apart from each other as well as to operate the guide member 310 and the transfer roller 320 of the disc transfer section 300 so that the guide member 310 and the transfer roller 320 come close to each other. The system controller also performs the operation of rotating the transfer roller 320. Accordingly, the sandwiching of the optical disc 10 by the turn table 222 and the rotor is released, and the optical disc 10 is sandwiched between the guide member 310 and the rotating transfer roller 320, thereby the optical disc 10 is unloaded through the opening.

Figure 6:
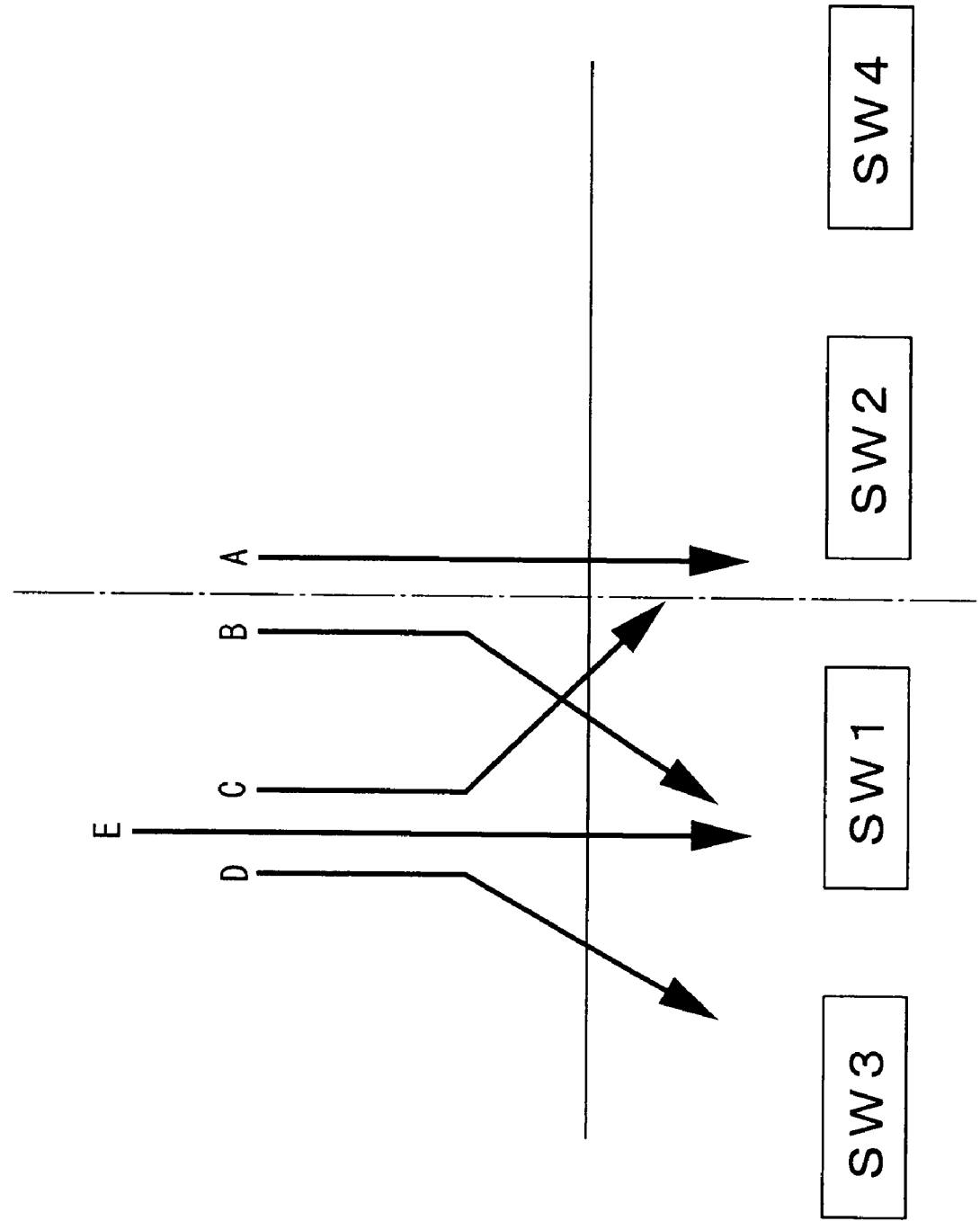
FIG. 6 is an explanatory illustration showing movement trajectories of the center of an optical disc in relation to sensor switches when being unloaded according to the embodiment.

When the optical disc 10 is unloaded, the optical disc 10 is normally transferred along the movement trajectory A (movement path) shown in FIG. 6 in the state that the center of the optical disc 10 moves on the axis of symmetry X. However, the optical disc 10 may be transferred with the center thereof off the axis of symmetry X, for example as shown in FIG. 5, due to the friction between the optical disc 10 and the guide member 310 or the transfer roller 320. Since the approximately 8 cm optical disc 10 has a particularly smaller diameter relative to the width of the opening, the approximately 8 cm optical disc 10 may be more likely to be unloaded with the center thereof off the axis of symmetry X compared with the approximately 12 cm optical disc. Specifically, the optical disc 10 may be unloaded along the movement trajectory B indicating the movement path on which the center of the optical disc 10 is displaced from the axis of symmetry X, the movement trajectory C indicating the movement path on which the center is once displaced from the axis of symmetry X but moves back onto the axis of symmetry X, the movement trajectory D indicating the movement path in which the center is once displaced from the axis of symmetry X and moves further off the axis of symmetry X, and the movement trajectory E indicating the movement path in which the center is displaced from the axis of symmetry X and keeps moving along the axis of symmetry X. FIG. 6 shows the movement trajectory in the case where the center of the optical disc 10 is displaced to one side of the axis of symmetry X for simple description. In the description below, the switches SW1 to SW4 that are indicated by the notations placed in the parentheses are the switches in the cases of displacing to the other side. In addition, the following explanations are examples mainly regarding the 8 cm optical disc 10.

In the case of the normal movement trajectory A, the peripheral edge of the optical disc 10 to be unloaded contacts with the sensor roller 511, and then, by the slide members 510 and 520 moving against the biasing force of the coil spring, the sensor switches SW1 and SW2 are switched off approximately at the same time as shown in FIGS. 7 (A) and (B), followed by approximately simultaneous switching off of the sensor switches SW3 and SW4 as shown in FIGS. 7 (C) and (D). As the optical disc 10 is unloaded, the slide members 510 and 520 move toward both sides. In such a condition, when the optical disc 10 is further unloaded, the sensor switches SW3 and SW4 are switched on again approximately at the same time as shown in FIGS. 7 (C) and (D). In this condition, the system controller operates so that the optical disc 10 having a diameter of 8 cm is transferred to the predefined remove position where the axial hole 10A of the optical disc 10 comes outside of the casing 110 from the opening. At that time, the system controller stops driving the transfer motor. In this state, since a portion of the peripheral edge of the optical disc 10 is sandwiched between the guide member 310 and the transfer roller 320, the optical disc 10 will not drop from the opening.

In the case of the movement trajectory B, since the center of the optical disc 10 is located on the axis of symmetry X at the beginning of unloading, the sensor switches SW1 and SW2 are switched off approximately at the same time as shown in FIGS. 8 (A) and (B). In other words, a time difference $\Delta t1$ that is a first time difference between the time points at which the sensor switch SW1 (SW2) is switched off and the other sensor switch SW2 (SW1) is switched off is approximately zero. Also with the movement trajectory B, since the center is displaced from the axis of symmetry X during unloading, the slide member 510 (520) of the side of displacement relative to the axis of symmetry X becomes more distant, the sensor switch SW3 (SW4) is switched off earlier than the sensor switch SW4 (SW3) as shown in FIGS. 8 (C) and (D), for example. When the sensor switch SW3 (SW4) is switched off, the system controller measures a time difference $\Delta t2$ that is a second time difference to the time point at which the sensor switch SW4 (SW3) is switched off using a timer (not shown). If the time difference $\Delta t1$ is approximately 0 and the time difference $\Delta t2$ exceeds a predefined time period, the system controller determines that the optical disc 10 is being unloaded along the movement trajectory B. When the optical disc 10 is further unloaded, because the slide member 510 (520) of the side of displacement relative to the axis of symmetry X is located at the more distant position relative to the axis of symmetry X, the sensor switch SW4 (SW3) is switched on before the sensor switch SW3 (SW4) is switched on as shown in FIGS. 8 (C) and (D).

If the drive of the transfer motor is stopped in the condition where the sensor switch SW3 (SW4) is on, the optical disc 10 is advanced to the position further than the remove position of the normal transferring, so that the optical disc 10 may not sandwiched by the guide member 310 and the transfer roller 320 and drop. On the other hand, if the drive of the transfer motor is stopped a little earlier in the condition where the sensor switch SW4 (SW3) is on, the unloading is stopped before reaching the remove position, so that the axial hole 10A is not fully advanced outside the casing 110 from the opening, thereby the optical disc 10 may not be appropriately removed. Accordingly, after a predefined time length $\alpha$ (e.g., $((\Delta t2)/2)+\rho$) has elapsed since the sensor switch SW4 (SW3) to be switched on first is switched on, the system controller performs a process of stopping the drive of the transfer motor based on, for instance, the time length of $\Delta t2$ or the time length between the time points at which the sensor switch SW2 (SW1) and the sensor switch SW3 (SW4) are switched off. In other words, the time length $\alpha$ is set so that the optical disc 10 is advanced for the approximately same amount as the case where the optical disc 10 is advanced to the remove position along the normal movement trajectory A based on the rotation speed of the transfer roller 320. Therefore, even in the case of the movement trajectory B, the unloading is completed after the optical disc 10 is advanced for the approximately same amount as the case where the optical disc 10 is advanced to the remove position along the normal movement trajectory A, thereby allowing the appropriate unloading of the optical disc 10, while eliminating the disadvantages such as the dropping of the optical disc 10 and difficulties in removing the disc.

In the case of the movement trajectory C, since the center is off the axis of symmetry X at the beginning of unloading, the slide member 510 (520) of the side of the displacement relative to the axis of symmetry X is more distant, so that the sensor switch SW1 (SW2) is switched off after the sensor switch SW2 (SW1) is switched off as shown in FIGS. 9 (A) and (B). When the sensor switch SW1 (SW2) is switched off, the system controller measures the time difference $\Delta t1$ to the time point at which the sensor switch SW2 (SW1) is switched off using the timer (not shown). When the optical disc 10 is further unloaded, the center of the optical disc 10 is located on the axis of symmetry X and the sensor switches SW3 and SW4 are switched off approximately at the same time as shown in FIGS. 9 (C) and (D) as with the case of the normal movement trajectory A. Accordingly, the system controller recognizes that the time difference $\Delta t2$ between the time points at which the sensor switches SW3 and SW4 are switched off is approximately zero and that the optical disc 10 is being unloaded along the movement trajectory C and is located in the center, which is the appropriate position. The system controller stops driving the transfer motor to complete the unloading, when recognizing that the sensor switches SW3 and SW4 are both switched on again.

Incidentally, in the case of the movement trajectory C, if the center of the optical disc 10 approaches the axis of symmetry X during unloading but does is not located on the axis of symmetry X, the sensor switch SW4 (SW3) is switched off after the sensor switch SW3 (SW4) of the side of displacement is switched off as shown in FIGS. 10 (C) and (D), causing the time difference $\Delta t2$. Hence, if the system controller determines that $\Delta t1 > \Delta t2$ based on the time differences $\Delta t1$ and $\Delta t2$, the system controller then determines that the center of the optical disc 10 is gradually approaching the axis of symmetry X. Hence, the system controller performs a process of stopping the drive of the transfer motor after a predefined time length $\epsilon$ (e.g., $((\Delta t2)/2)-\rho$) has elapsed since the sensor switch SW4 (SW3) to be switched on first is switched on based on, for example, the time length of $\Delta t2$ or the time differences $\Delta t1$ and $\Delta t2$ between the time points at which the sensor switches SW2 (SW1) and the sensor switches SW3 (SW4) are switched off. Incidentally, the time length $\epsilon$ is set to be shorter than the time length $\alpha$ in the movement trajectory B. In other words, the time length is set so that the unloading can be completed with the approximately equal amount of advancement as the case where the optical disc 10 is advanced to the remove position along the normal movement trajectory A. Therefore, even in the case of the movement trajectory C in which the center has not reached onto the axis of symmetry X, the disadvantages such as the dropping of the optical disc 10 and difficulties in removing the disc can be eliminated, thereby allowing the appropriate unloading of the optical disc 10.

In the case of the movement trajectory D, since the center of the optical disc 10 is off the axis of symmetry X at the beginning of unloading, the slide member 510 (520) of the side of displacement relative to the axis of symmetry X is more distant, so that the sensor switch SW2 (SW1) is switched off after the sensor switch SW1 (SW2) is switched off as shown in FIGS. 11 (A) and (B). When the sensor switch SW2 (SW1) is switched off, the system controller measures the time difference $\Delta t1$ to the time point at which the sensor switch SW1 (SW2) is switched off using the timer (not shown). In the movement trajectory D, since the center moves further away from the axis of symmetry X during unloading, the slide member 510 (520) of the side of displacement relative to the axis of symmetry X is more distant, so that the sensor switch SW3 (SW4) is switched off earlier than the sensor switch SW4 (SW3) as shown in FIGS. 11 (C) and (D) for example. When the sensor switch SW3 (SW4) is switched off, the system controller measures the time difference $\Delta t2$ to the time point at which the sensor switch SW4 (SW3) is switched off using the timer (not shown).

Then, if the system controller determines that $\Delta t1 < \Delta t2$ based on the time differences $\Delta t1$ and $\Delta t2$, the system controller determines that the optical disc 10 is being transferred along the movement trajectory D. Hence, the system controller performs a process of stopping the drive of the transfer motor after a predefined time length $\beta$ (e.g., $((\Delta t2)/2)+2\rho$) has elapsed since the sensor switch SW4 (SW3) to be switched on first is switched on based on, for example, the time length of $\Delta t2$ or the time differences between the time points at which the sensor switches SW2 (SW1) and the sensor switches SW3 (SW4) are switched off. Incidentally, the time length $\beta$ is set to be longer than the time length $\alpha$ in the movement trajectory B. In other words, the time length is set so that the unloading can be completed with approximately equal amount of advancement as the case where the optical disc 10 is advanced to the remove position along the normal movement trajectory A. Therefore, even in the case of the movement trajectory D, the disadvantages such as the dropping of the optical disc 10 and difficulties in removing the disc can be eliminated, thereby allowing the appropriate unloading of the optical disc 10.

In the case of the movement trajectory E, since the center of the optical disc 10 is off the axis of symmetry X at the beginning of unloading the slide member 510 (520) of the side of displacement relative to the axis of symmetry X is more distant, so that the sensor switch SW2 (SW1) is switched off after the sensor switch SW1 (SW2) is switched off as shown in FIGS. 12 (A) and (B). When the sensor switch SW1 (SW2) is switched off, the system controller measures the time difference $\Delta t1$ to the time point at which the sensor switch SW1 (SW2) is switched off using the timer (not shown). In the movement trajectory E, since the center keeps moving in the state where the center is off the axis of symmetry X during unloading, the sensor switch SW3 (SW4) is switched off earlier than the sensor switch SW4 (SW3) as shown in FIGS. 12 (C) and (D) for example. When the sensor switch SW3 (SW4) is switched off, the system controller measures the time difference $\Delta t2$ to the time point at which the sensor switch SW4 (SW3) is switched off using the timer (not shown).

In the movement trajectory E, since the amount of displacement of the center from the axis of symmetry X remains substantially the same, the time differences $\Delta t1$ and $\Delta t2$ are approximately equal, i.e. $\Delta t1 = \Delta t2$. Hence, the system controller determines that the optical disc 10 is being transferred along the movement trajectory E, and performs a process of stopping the drive of the transfer motor after a predefined time length $\gamma$ (e.g., $(\Delta t2)/2$) has elapsed since the sensor switch SW4 (SW3) to be switched on first is switched on based on, for example, the time length of $\Delta t2$ or the time differences between the time points at which the sensor switches SW2 (SW1) and the sensor switches SW3 (SW4) are switched off for example. Incidentally, the time length $\gamma$ is set to be $\epsilon < \gamma < \alpha < \beta$, that is, longer than the time length $\alpha$ in the movement trajectory B and shorter than the time lengths $\alpha$ and $\beta$ in the movement trajectories B and D, respectively. In other words, the time length is set so that the unloading can be completed with the approximately equal amount of advancement as the case where the optical disc 10 is advanced to the remove position along the normal movement trajectory A. Therefore, even in the case of the movement trajectory E, the disadvantages such as the dropping of the optical disc 10 and difficulties in removing the disc can be eliminated, thereby allowing the appropriate unloading of the optical disc 10.

[Effects of Disc Unit]

As stated above, in the above-described embodiment, the detector 500 detects the difference between the position of the center of the optical disc 10 relative to the transfer direction of the optical disc 10 at the substantially center of the opening and the axis of symmetry X which is the reference movement path, and according to this detection status of the optical disc 10, i.e. the displacement of the center of the optical disc 10 from the axis of symmetry X, the detector 500 controls the drive of the transfer motor. Thus, since the disadvantages when unloading such as the dropping of the optical disc 10 and difficulties in removing the disc which are caused by that the timing for stopping the unloading is off because the optical disc 10 is unloaded in the state of being displaced from the reference (center) position can be prevented, the unloading can be completed at the same position as the case of being unloaded along the movement trajectory A (the reference movement path), thereby appropriately unloading the optical disc 10.

Additionally, the unloading direction of the optical disc 10 in substantially the center of the opening is defined as the axis of symmetry X, and the sensor switches SW1 to SW4 for sensing the optical disc 10 are disposed adjacent to the opening edge of the opening so that the sensor switches SW1 to SW4 have the different distance from the axis of symmetry X. Thus, the difference between the center position of the optical disc 10 and the movement trajectory A (the reference movement path) can be detected by a simple configuration, so that the appropriate unloading can be obtained by s simple arrangements.

In addition, for sensing the optical disc 10, there provided are a sensor with which the peripheral surface of optical disc 10 contacts and the slide members 510 and 520 movable along the width direction of the casing 110, and the sensor switches SW1 to SW4 are switched on and off according to the movement status of the slide members 510 and 520. Therefore, the movement status of the optical disc 10 during unloading can be recognized with a simple structure, thereby the appropriate unloading can be obtained by s simple arrangements.

As the arrangement for switching the sensor switches SW1-SW4 on or off, the sensor switches SW1 and SW2 and the sensor switches SW3 and SW4 are disposed at the positions where each pair are displaced in the transfer direction, and the sensor arms 512 constituting the slide members 510 and 520 are provided with a first step 512A and a second step 512B that form the steps in the slide direction. Therefore, the optical disc 10 can be sensed with a simple arrangement, thereby the appropriate unloading can be easily obtained.

Further, the sensor switches SW1 and SW2 are disposed at the positions such that, when the optical disc 10 having a diameter of 12 cm is inserted with the center thereof maximally displaced to one side relative to the axis of symmetry X, causing the peripheral edge of the optical disc 10 to contact with the opening edge of the opening, the peripheral edge of the optical disc 10 contacts with the sensor rollers 511 of both slide members 510 and 520 immediately before the peripheral edge of the optical disc 10 contacts with the peripheral surface of the transfer roller 320 to switch off both of the sensor switches SW1 and SW2. Accordingly, by sensing the optical disc 10, the transfer roller 320 can be rotated before the peripheral edge of the optical disc 10 contacts with the transfer roller 320, preventing the optical disc 10 from slipping into between the transfer roller 320 and the guide member 310, and thereby securely preventing the recording surface from being damaged by the scraping of the optical disc 10 against the transfer roller 320, and improving the usability because the optical disc can be inserted without worrying about the insertion position.

The sensor switches SW1 and SW2 are disposed such that, when the optical disc 10 having a diameter of approximately 8 cm is inserted through the opening, the peripheral edge thereof contacts with the sensor roller 511 immediately before contacting with the peripheral surface of the transfer roller 320, thereby switching off at least either one of the sensor switches SW1 or SW2. Therefore, even if the optical disc 10 having a small diameter of 8 cm is inserted with the center thereof maximally displaced from the center of the opening, the rotation of the transfer roller 320 is started before the optical disc 10 contacts with the transfer roller 320, where even if the optical disc 10 having a different diameter is inserted, the transfer roller 320 is surely rotated, so that the loading can be performed without damaging the recording surface, the usability can be improved because the optical disc can be inserted without worrying about the insertion position.

The sensor switches SW1 and SW2 are disposed at a location such that the sensor switches are switched on when the optical disc 10 is substantially located at the processing position and the loading sensor 400 detects that the optical disc 10 is substantially located at the processing position. In other words, if the optical disc 10 is located at the processing position, it means that the optical disc 10 is not contacting the sensors of the slide members 510 and 520. Hence, the optical disc 10 can be stably rotated for allowing stable information processing.

In addition, the sensor switches SW3 and SW4 are disposed at a location such that, when the optical disc 10 having a diameter of approximately 8 cm is unloaded from the casing 110, both sensor switches SW3 and SW4 are approximately simultaneously switched from on to off, in a state that, when the optical disc 10 having a diameter of approximately 8 cm is unloaded from the casing, a portion of the peripheral edge is sandwiched by the guide member 310 and the transfer roller 320 and the axial hole 10A opened substantially in the center of the optical disc 10 is located outside the casing 110 from the opening. Therefore, the displacement condition of the optical disc 10 when being transferred can be easily recognized, and even in case of the optical disc having a small diameter of 8 cm, the unloading can be completed in the state where the axial hole 10A is moved outward, preventing the disc drop and allowing an easy removal of the disc.

Furthermore, in the state where the sensor switches SW1, SW3 (SW2, SW4) are switched off, the sensor switches SW4 (SW3) are disposed so that the sensor switches SW4 (SW3) are switched on before the sandwiching by the roller 320 and the guide member 310 of the peripheral surface of the approximately 8 cm optical disc 10 to be transferred is released. Therefore, the displacement condition of the optical disc 10 when being transferred can be easily recognized, and even in case of the optical disc having a small diameter of 8 cm, the unloading can be completed in the state where the axial hole 10A is moved outward, preventing the disc drop and allowing easy removal of the disc.

Additionally, the type sensor switch SW5 is provided at a location on one side of the longitudinal direction of the opening for sensing the optical disc 10. Hence, the optical discs 10 having different diameters can be easily sensed with a simple arrangement and easily controlled so that the unloading thereof can be completed at an appropriate position. Further, the sensor switch SW5 is disposed at such a position that, when the optical disc 10 having a diameter of approximately 12 cm is inserted, immediately before the peripheral surface of the optical disc 10 contacts with the transfer roller 320, the sensor switch SW5 is switched on by the type sensor arm 513 and the sensor switch SW2 is switched off. Therefore, the insertion of the optical disc 10 can be securely sensed even if the optical disc 10 is inserted with the center thereof displaced, so that the optical disc 10 can be loaded while rotating the transfer roller 320, thereby as stated above, the appropriate loading can be obtained without damaging the recording surface and the usability can be improved because the optical disc can be inserted without worrying about the insertion position.

The drive of the transfer motor of the disc transfer section 300 is controlled based on the time difference $\Delta t1$ between the time points at which the sensor switches SW1 and SW2 are switched off and the time difference $\Delta t2$ between the time points at which the sensor switches SW3 and SW4 are switched off. In other words, since the time differences $\Delta t1$ and $\Delta t2$ indicates the displacement condition of the center of the optical disc 10 to be unloaded relative to the axis of symmetry X, the movement condition during the unloading of the optical disc 10 can be easily recognized by the time differences $\Delta t1$ and $\Delta t2$, thereby the control for stopping the unloading at an appropriate position can be easily performed. Furthermore, the unloading control according to the movement condition can be obtained by a simple calculation based on the magnitude relation between the time differences $\Delta t1$ and $\Delta t2$.

If the time difference $\Delta t2$ is approximately zero, the transfer motor is stopped at the time point when the sensor switches SW3 and SW4 are switched on again approximately simultaneously. That is, if the time difference $\Delta t2$ is approximately zero, the center of the optical disc 10 to be transferred is located on the axis of symmetry X at the time point when the sensor switches SW3 and SW4 are switched on again approximately simultaneously. Therefore, at the time point when the sensor switches SW3 and SW4 are switched on again approximately simultaneously, the optical disc 10 is being transferred with its center located on the axis of symmetry X, so that, by stopping the unloading at that time point, the unloading can be completed with the reference amount of advancement, thereby the appropriate unloading can be performed by the simple sensing and time control.

The predefined time lengths of $\epsilon$, $\gamma$, $\alpha$, and $\beta$ are set to have the time length relationship of $\epsilon<\gamma<\alpha<\beta$. In the case that the time difference $\Delta t1$ is approximately zero and the time difference $\Delta t2$ is longer than the time difference $\Delta t1$, the movement trajectory is determined to be B, where the transfer motor is driven for a time length $\alpha$ after the sensor switch SW4 (SW3) is switched on again; in the case that neither time difference $\Delta t1$ nor $\Delta t2$ is zero and $\Delta t1$ is approximately equal to $\Delta t2$, the movement trajectory is determined to be E, where the transfer motor is driven for a time length $\gamma$ after the sensor switch SW4 (SW3) is switched on again; and in the case that neither time difference $\Delta t1$ nor $\Delta t2$ is zero and the time length $\Delta t2$ is longer than the time length $\Delta t1$, the movement trajectory is determined to be D, where the transfer motor is driven for a time length $\beta$ after the sensor switch SW4 (SW3) is switched on again. Therefore, even if a displacement occurs, the appropriate unloading can be performed by the simple sensing and time control in a simple arrangement.

The time lengths $\epsilon$, $\alpha$, $\beta$ and $\gamma$ is set to be the time length to the time point at which the other sensor switch SW3 (SW4) is switched on again, i.e. set to the time length providing an approximately same amount of advancement as the case of being advanced to the remove position along the normal movement trajectory A based on the rotation speed of the transfer roller 320. Thus, the unloading process in which the amount of advancement is approximately constant can be easily obtained by a simple calculation in a simple arrangement.

When the loading sensor 400 for sensing the presence of the optical disc 10 at the processing position recognizes that the optical disc 10 is not at the position as well as that the sensor switches SW1 and SW2 are off, the control is performed for driving the transfer motor. Therefore, when the optical disc 10 has been already inserted, even if the other insertion of the optical disc 10 is detected, the transfer motor will not be driven, thereby preventing an erroneous insertion.

When the signal for requesting the unloading is recognized, the process for unloading the optical disc 10 is started. Specifically, if the detector 500 detects the presence of the optical disc 10 when the optical disc 10 is not being inserted, it can be recognized that the optical disc 10 has already been inserted, so that, based on the signal for requesting the loading, the transfer motor can be driven or the driving force thereof can be transmitted to rotate the transfer motor in the predefined direction according to the recognition of the insertion status of the optical disc 10. In addition, by recognizing the signal for requesting the unloading, the transfer roller 320 can be controlled to rotate in the direction for unloading. Thus, it is not necessary to provide transfer units each for loading and unloading, but a single arrangement can operate both of loading and unloading, where the downsizing can be easily obtained.

The disc transfer section 300 is arranged so as to transfer by sandwiching with the guide member 310 of the reversed V-shape when viewed from the front thereof and the transfer roller 320 of the elongated, concave drum shaped when viewed from the front thereof. Therefore, the more the center of the optical disc 10 is displaced from the axis of symmetry X, the more unbalanced the sandwiching force at the sandwiching position becomes, so that the optical disc is rarely unloaded in the state of being largely displaced, thereby the control with the stable amount of advancement at the unloading completion position can be easily obtained by the above-described simple arrangement constituted by the sensor switches SW1 to SW4 and the slide members 510, 520.

MODIFICATIONS

Note that the present invention is not limited to the above embodiments but includes modifications as long as an object of the present invention can be attained.

Specifically, although the disc unit 100 using a disc recording medium is described as an example, it is not limited to the optical disc 10, but any type of disc recording medium such as a magnetic disc, magnetooptical discs or the like is also available. Either one of reading-out process or recording process may be performed in an arrangement of the present invention. The article to be unloaded may not be a recording medium but any type of disc-shape medium. Also, the arrangement may not be built in the electrical device, but may be a stand-alone type. Further, the system controller provided as a circuit board installed within the disc unit 100 may be a single element or program. In addition, the system controller may not be built in the disc unit 100, but may be the stand-alone arrangement for controlling the drive of the transfer unit as a control device of the detector 500 and the system controller, or a stand-alone arrangement in which the transfer unit and unloading device are used in combination.

Additionally, as the disc transfer section 300 for transferring the optical disc 10, the above-described arrangement may not be used, but may be any kind of arrangement may be used such as unloading by a pair of rollers or by a rotating arm. Furthermore, although the arrangement for controlling both of loading and unloading is described, the arrangement for controlling unloading only may be employed.

The present invention has been described in the arrangement where the optical disc 10 to be unloaded is detected by the sensor switches SW1 to SW4, but it is not limited to the arrangement using the switches, and, for instance, a photo sensor may be used. It is not limited to two pairs of switches (four switches), but the switches may be disposed serially at the opening edge. Also, the sensor switches SW1 to SW4 may not be disposed the above-described locations. If the displacement of the optical disc 10 to be unloaded can be detected, any arrangement may be employed, such as the arrangement that the disc unit 100 does not perform the transferring of the 8 cm disc. Moreover, the type sensor switch SW5 may not be provided. Regarding how to control, any arrangement may be employed, if the control can be performed depending on the sensing arrangement so that the amount of advancement is constant by changing the timing for completing the unloading according to the displacement.

Figure 13:
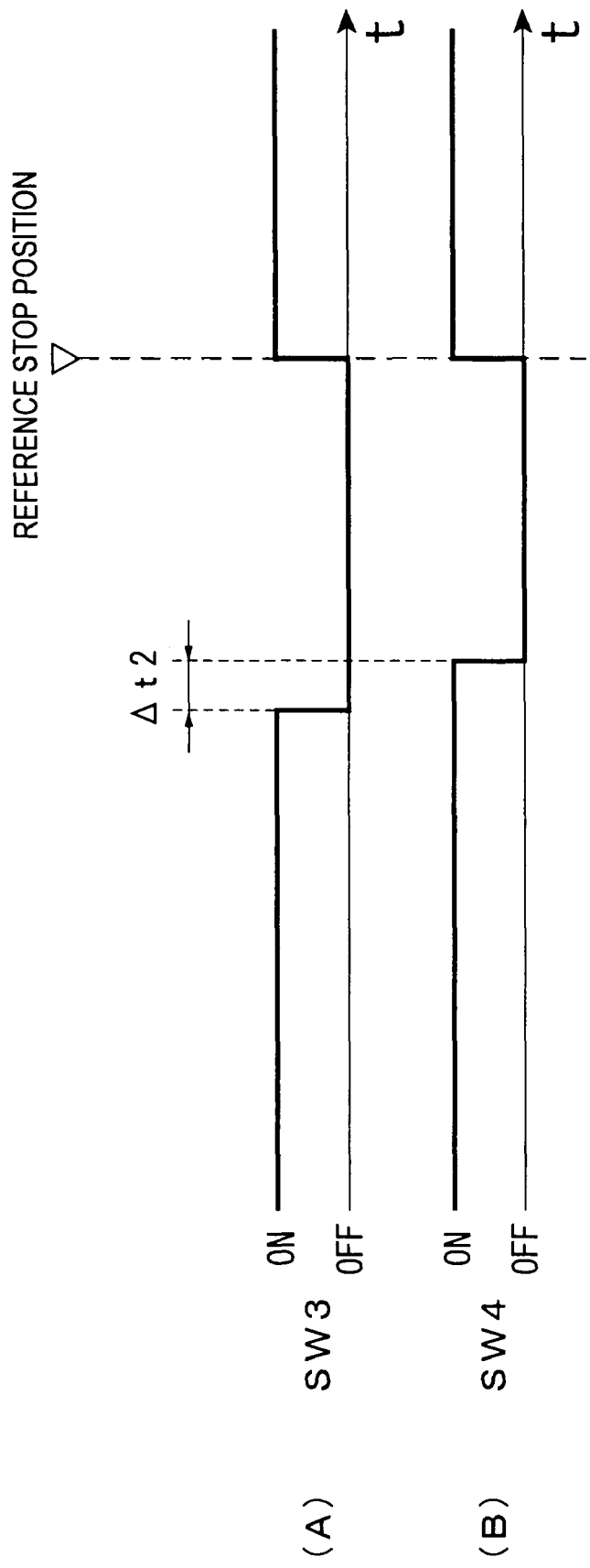
FIG. 13 is a waveform illustration of a sensor switch when the optical disc is substantially unloaded along a standard movement trajectory of a disc unit according to another embodiment of the present invention, in which (A) is a waveform illustration of the sensor switch SW3, and (B) is a waveform illustration of the sensor switch SW4.
Figure 14:
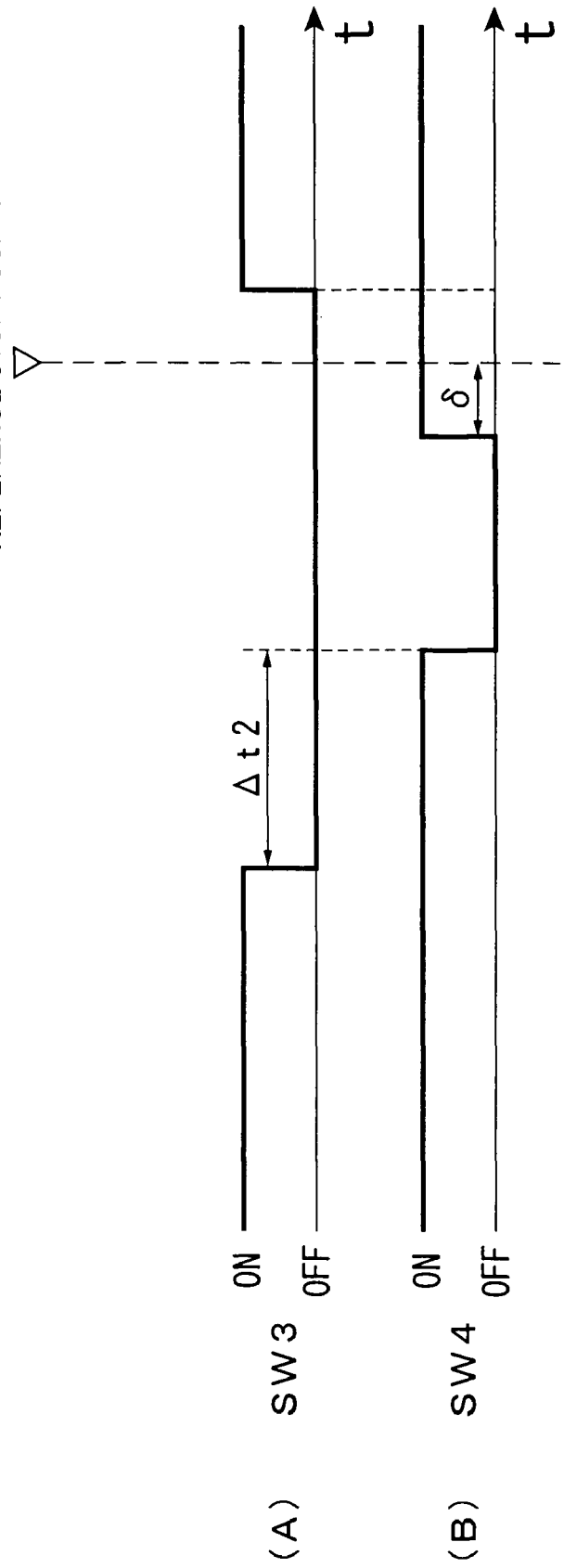
FIG. 14 is a waveform illustration of the sensor switch when the optical disc is unloaded off the standard movement trajectory according to the other embodiment, in which (A) is a waveform illustration of the sensor switch SW3, and (B) is a waveform illustration of the sensor switch SW4.

Furthermore, although the arrangement having the two pairs of sensor switches (four sensor switches) SW1 to SW4 has been described, an arrangement having a single pair of sensor switches may be employed. For example, the two sensor switches SW3 and SW4, as shown in FIGS. 13 and 14, may also be used to control such that the amount of advancement is constant.

Specifically, based on the sensing status of the optical disc 10 by the pair of sensor switches SW3 and SW4, i.e. the timings at which the sensor switches SW3 and SW4 are switched on or off, the time difference $\Delta t2$ between the time points at which the sensor switches SW3 and SW4 detects the optical disc 10 to be switched off is measured. If the time difference $\Delta t2$ is a relatively short time not exceeding a predefined period of time (the predefined threshold value) as shown in FIG. 13 for example, the time difference is judged to be within an error range and the drive of the transfer motor is stopped at the time point when both sensor switches SW3 and SW4 approximately simultaneously become unable to detect to be switched on. On the other hand, as shown in FIG. 14 for example, if the time difference Δt2 is recognized to be equal to or longer than the predefined period of time, the system controller judges that the optical disc 10 is being transferred with displacement and stops driving the transfer motor after a predefined time length δ has elapsed since one of the sensor switches SW4 or SW3, i.e. the sensor switch SW4 that first becomes unable to detect the optical disc 10 is switched on. Accordingly, the unloading is completed at a substantially same position as the unloading stop position of the optical disc 10 when the optical disc 10 is transferred with the center thereof substantially on the axis of symmetry X, as shown in FIG. 12. Here, as the predefined time length δ, a value such as (Δt2)/2 may be exemplified. That is, since the time difference between switching from on to off and the time difference between switching from off to on are approximately the same in most cases, the unloading can be completed at an approximately same position by setting the time to stop to (Δt2)/2.

As mentioned above, although the control based on the time differences Δt1 and Δt2 is described above, the control may be judged by any other time difference as a reference, for instance, by using other time differences that occur when the sensor switch SW2 (SW1) and the sensor switch SW3 (SW4) are switched off. In addition, the control may be performed in consideration of further another time reference. By employing such arrangement, the displacement condition of the optical disc 10 during unloading can be securely recognized, and thereby the unloading can be appropriately performed with a constant amount of advancement. Furthermore, the unloading may not be controlled by the time difference, but may be controlled by controlling the rotation speed of the transfer roller 320 according to the displacement condition such that the amount of advancement is kept constant. The control may be performed according to the positional relation with the sensor.

In other words, the following equation (1) holds, $$(X-x)^2+(Y-y)^2=(D+d)^2 \qquad (1)$$

where (X, Y) is the center position of the sensor, D is the diameter of the detector, d is the diameter of the article to be transferred, and (x, y) is the center position of the article.

At the sensing position when the sensor switch SW3 (SW4) is switched off, the values of (X, Y), d and D are constant. Accordingly, since the center position of the article can be specified using equation (1), the amount of unloading can be specified based on the center position and the reference position in order to control the rotational driving of the transfer roller 320 according to the corresponding time. Even if the rotation speed of the transfer roller 320 varies due to the environment for example, the control can be performed by specifying the speed based on the relationship of time, speed, and distance using the equation (1) for the positions of the sensor switches SW1 to SW4.

Specifically, the following equations (2) and (3) can be obtained based on the equation (1), then the speed V can be recognized based on the equation (4).

$$(Xsw1-xsw1)^2+(Ysw1-V\times\Delta t1)^2=(D+d)^2 \qquad (2)$$

$$(Xsw3-xsw3)^2+(Ysw3-V\times\Delta t2)^2=(D+d)^2 \qquad (3)$$

$$V=(xsw1-xsw3)/\Delta tc \qquad (4)$$

where (Xsw3, Ysw3) is the position of the sensor switch SW3 (SW4) located at the side of displacement, (Xsw1, Ysw1) is the position of the sensor switch SW1 (SW2), and (xsw3, ysw3) and (xsw1, ysw1) are the centers of the article to be transferred when being sensed. In the equation (4), Δtc is the absolute value of (Δt1−Δt2).

Though the present invention has been described above with reference to the examples of arrangements and procedures, the scope of the invention is not limited thereto but includes various other arrangements or the like as long as an object of the present invention can be achieved.

EFFECTS OF THE EMBODIMENTS

As stated above, the difference between the center position of the optical disc 10 and the axis of symmetry X (the reference movement path) relative to the transfer direction of the optical disc 10 substantially at the center of the opening is detected by the detector 500, and the drive of the transfer motor is controlled according to the detection status of the optical disc 10, i.e. the difference between the center of the optical disc 10 and the axis of symmetry X. Therefore, even if the optical disc 10 is unloaded with the center thereof displaced, the unloading can be completed at a similar position as with the case where the optical disc 10 is unloaded along the movement trajectory A (the reference movement path), thereby obtaining an appropriate unloading.

In addition, when the center position of the optical disc 10 relative to the transfer direction of the optical disc 10 substantially at the center of the opening is detected, if the time difference Δt2 between the time points that the sensor switches SW3 and SW4 of the detector 500 which are disposed at a substantially same distance from the axis of symmetry X (the reference movement path) detect the optical disc 10, the control is performed for changing the timing to stop the drive of the transfer motor. Thus, even if the optical disc 10 is unloaded with the center thereof displaced, the unloading can be completed at a similar position as with the case where the optical disc 10 is unloaded along the reference movement path without displacement, thereby obtaining an appropriate unloading.

Furthermore, when the two pairs of sensor switches, SW1 to SW4 disposed at different distances from the axis of symmetry X (the reference movement path) detect the center position of the optical disc 10 relative to the transfer direction of the optical disc 10 substantially at the center of the opening, the drive of the transfer motor is controlled according to the detection status of the optical disc 10. Therefore, even if the optical disc 10 is unloaded with the center thereof displaced, the unloading can be completed at a similar position as with the case where the optical disc 10 is unloaded along the movement trajectory A (the reference movement path), thereby obtaining an appropriate unloading.

The priority application Number JP2004-105055 upon which the patent application is based is hereby incorporated by reference.

What is claimed is:

1. A transfer control device to control an unloading unit that is driven to unload a disc article to be unloaded from a casing through an opening such that the center of the disc article is moved along a reference movement path along a direction of a diameter of the disc article, the transfer control device comprising:

a detector to detect a difference of a moving path of the center of the disc article relative to the reference movement path of the disc article; and a driving controller to control the drive of the unloading unit according to a detection status of the disc article by the detector, wherein the detector includes;

a first pair of sensors that are equidistantly disposed relative to the reference movement path, the first pair of sensors being disposed such that: when the disc article is loaded at a load completion position, the first pair of sensors are in a non-detection state of not sensing the disc article and then turn to a detection state of sensing the disc article; and when the disc article is unloaded to a predetermined remove position after the disc article is moved along the reference movement path, the first pair of sensors substantially simultaneously return from the detection state to the non-detection state; wherein while moving the disc article, the driving controller recognizes a time difference between a time point at which one of the first pair of sensors turns from the non-detection state to the detection state and another time point at which the other of the first pair of sensors turns from the non-detection state to the detection state after the one of the first pair of sensors turns, and, when the recognized time difference is equal to or less than a predefined period of time, the driving controller stops the drive of the unloading unit when the first pair of sensors substantially simultaneously turn from the non-detection state to the detection state, but when the recognized time difference is greater than the predefined period of time, then, after a predetermined time interval elapses after the other of the first pair of sensors turns from the detection state to the non-detection state, the driving controller stops the drive of the unloading unit.

2. The transfer control device according to claim 1, wherein the predetermined time interval is set based on a magnitude of the recognized time difference.

3. The transfer control device according to claim 2, wherein the predetermined time interval is half the recognized time difference.

4. The transfer control device according to claim 1, wherein the detector further comprises a second pair of sensors in addition to the first pair of sensors, the second pair of sensors being equidistantly disposed relative to the reference movement path and being located closer to the reference movement path relative to the first pair of sensors, the second pair of sensors being disposed such that: the second pair of sensors are in the non-detection state when the disc article is loaded at the load completion position; and, while the disc article is unloaded, the second pair of sensors turns to the detection state before the first pair of sensors turn from the non-detection state to the detection state, the driving controller recognizes a second time difference between a time point at which one of the second pair of sensors turns from the non-detection state to the detection state and another time point at which the other of the second pair of sensors turns from the non-detection state to the detection state, and the predetermined time interval is set according to a magnitude of the first time difference recognized by the second pair of sensors and a magnitude of a second time difference recognized by the first pair of sensors.

5. The transfer control device according to claim 4, wherein the predetermined time interval that is set when the first time difference is substantially zero and the second time difference is greater than the first time difference is longer than the predetermined time interval that is set when both of the first and the second time differences are not zero and the second time difference is substantially equal to the first time difference.

6. The transfer control device according to claim 4, wherein the predetermined time interval, that is set when both of the first and the second time differences are not zero and the second time difference is greater than the first time difference, is longer than the predetermined time interval that is set when the first time difference is substantially zero and the second time difference is greater than the first time difference.

7. A transfer control method for unloading a disc article to be unloaded by driving an unloading unit such that the center of the disc article is moved along a reference movement path along a direction of a diameter of the disc article from a casing through an opening, comprising providing a detector to detect a difference of a moving path of the center of the disc article relative to the reference movement path of the disc article at the center of the opening, the detector including a pair of sensors to detect the disc article that are equidistantly disposed from the reference movement path of the disc article;

disposing the pair of sensors such that: when the disc article is loaded at a load completion position, the pair of sensors are in a non-detection state of not sensing the disc article and then turn to a detection state of sensing the disc article; and when the disc article is unloaded to a predetermined remove position after the disc article is moved along the reference movement path, the pair of sensors substantially simultaneously return from the detection state to the non-detection state; wherein while moving the disc article, recognizing a time difference between a time point at which one of the pair of sensors turns from the non-detection state to the detection state and another time point at which the other of the pair of sensors turns from the non-detection state to the detection state after the one of the first pair of sensors turns, and, when the recognized time difference is equal to or less than a predefined period of time, stopping the drive of the unloading unit when the first pair of sensors substantially simultaneously turn from the non-detection state to the detection state, but when the recognized time difference is greater than the predefined period of time, then, after a predetermined time interval elapses after the other of the first pair of sensors turns from the detection state to the non-detection state, stopping the drive of the unloading unit.

8. A transfer unit, comprising:

an unloading unit that is driven to unload a disc article such that the center of the disc article is moved along a reference movement path along a direction of a diameter of the disc article from a casing through an opening;

a transfer control device to control the drive of the unloading unit, the transfer control device including:

a detector to detect a difference of a moving path of the center of the disc article to be unloaded relative to the reference movement path of the disc article at the center of the opening; and a driving controller to control the drive of the unloading unit according to a detection status of the disc article by the detector; wherein the driving controller includes a pair of sensors that are equidistantly disposed relative to the reference movement path, the pair of sensors being disposed such that: when the disc article is loaded at a load completion position, the pair of sensors are in a non-detection state of not sensing the disc article and then turn to a detection state of sensing the disc article; and when the disc article is unloaded to a predetermined remove position after the disc article is moved along the reference movement path, the pair of sensors substantially simultaneously return from the detection state to the non-detection state; wherein while moving the disc article, the driving controller recognizes a time difference between a time point at which one of the pair of sensors turns from the non-detection state to the detection state and another time point at which the other of the first pair of sensors turns from the non-detection state to the detection state after the one of the first pair of sensors turns, and, when the recognized time difference is equal to or less than a predefined period of time, the driving controller stops the drive of the unloading unit when the first pair of sensors substantially simultaneously turn from the non-detection state to the detection state, but when the recognized time difference is greater than the predefined period of time, then, after a predetermined time interval elapses after the other of the first pair of sensors turns from the detection state to the non-detection state, the driving controller stops the drive of the unloading unit.

9. The transfer unit according to claim 8, wherein the disc article is a disc recording medium having a recording surface on which information is recorded at least on one side thereof.

10. A disc unit, comprising:
a casing:
an information processor disposed in the casing to perform at least either one of a read-out process to read out information recorded on a recording surface of a disc article or a recording process to record the information on the recording surface;
an unloading unit that is driven to unload the disc article to be unloaded such that the center of the disc article is moved along a reference movement path along a direction of a diameter of the disc article from a casing through an opening by the drive thereof; and a transfer control device to control the drive of the unloading unit,
the transfer control device including:
a detector to detect a difference of a moving path of the center of the disc article to be unloaded relative to the reference movement path; and
a driving controller to control the drive of the unloading unit according to a detection status of the disc article by the detector, wherein
the detector includes:
a pair of sensors to detect the disc article that are equidistantly disposed from the reference movement path, the pair of sensors being disposed such that: when the disc article is loaded at a load completion position, the pair of sensors are in a non-detection state of not sensing the disc article and then turn to a detection state of sensing the disc article; and when the disc article is unloaded to a predetermined remove position after the disc article is moved along the reference movement path, the pair of sensors substantially simultaneously return from the detection state to the non-detection state; wherein while moving the disc article, the driving controller recognizes a time difference between a time point at which one of the pair of sensors turns from the non-detection state to the detection state and another time point at which the other of the pair of sensors turns from the non-detection state to the detection state after the one of the first pair of sensors turns, and, when the recognized time difference is equal to or less than a predefined period of time, the driving controller stops the drive of the unloading unit when the first pair of sensors substantially simultaneously turn from the non-detection state to the detection state, but when the recognized time difference is greater than the predefined period of time, then, after a predetermined time interval elapses after the other of the first pair of sensors turns from the detection state to the non-detection state, the driving controller stops the drive of the unloading unit.

* * * * *